(12) United States Patent
Davis et al.

(10) Patent No.: US 8,082,337 B1
(45) Date of Patent: Dec. 20, 2011

(54) SYSTEM FOR ASSESSMENT OF POLICY COMPLIANCE OF AN ARBITRARY INFORMATION TOPOLOGY

(75) Inventors: Cornelia Davis, Santa Barbara, CA (US); John Field, Chatham, NJ (US); Stephen G. Graham, Chapel Hill, NC (US); Thomas R. Maguire, Brewster, NY (US)

(73) Assignee: EMC Corporation, Hopkinton, MA (US)

( * ) Notice: Subject to any disclaimer, the term of this patent is extended or adjusted under 35 U.S.C. 154(b) by 277 days.

(21) Appl. No.: 12/413,806

(22) Filed: Mar. 30, 2009

(51) Int. Cl.
*G06F 15/16* (2006.01)
(52) U.S. Cl. .......................... 709/223; 726/1
(58) Field of Classification Search .................. 709/223, 709/224; 726/1
See application file for complete search history.

(56) References Cited

U.S. PATENT DOCUMENTS

2002/0188643 A1 * 12/2002 Kennedy ........................ 709/1

OTHER PUBLICATIONS

Conway, R. "Data Topology" 2008 White paper from neosllc.com. 4 pages.*

* cited by examiner

*Primary Examiner* — David Lazaro
(74) *Attorney, Agent, or Firm* — Krishnendu Gupta; Joseph D'Angelo

(57) ABSTRACT

A system, method, and apparatus for representing an information topology on a computer, wherein the represented information topology comprises a plurality of information nodes and a plurality of states, representing a set of polices on the computer, wherein each policy expresses one or more requirements applied to the plurality of information nodes, and assessing compliance of the represented information topology by determining on the computer whether the plurality of states meet the requirements expressed in the plurality of policies.

20 Claims, 33 Drawing Sheets

Let $X' = f(X)$ where $f$ returns the list of principals (users & groups) who have access to any information resource in the set $X$

Exclusion List $\{\{A, B\}, \{C, D\}, \ldots\}$

Policy $(A' \cap B' = \varnothing) \wedge (C' \cap D' = \varnothing) \wedge \ldots$ $\Rightarrow \{\{\{a_1, a_2, a_3, \ldots\}, \{b_1, b_2, b_3, \ldots\}\},$
$\{\{c_1, c_2, c_3, \ldots\}, \{d_1, d_2, d_3, \ldots\}\},$
$\ldots\}$ Let $A_i$ be the set of all $a_j$ where $a_j$ is managed by SCP i $\Rightarrow \{\{\{A_1 \cup A_2 \cup A_3 \ldots, B_1 \cup B_2 \cup B_3 \ldots\},$
$\{C_1 \cup C_2 \cup C_3 \ldots, D_1 \cup D_2 \cup D_3 \ldots\},$
$\ldots\}$ $((A'_1 \cup A'_2 \cup A'_3 \ldots) \cap (B'_1 \cup B'_2 \cup B'_3 \ldots) = \varnothing) \wedge$
$((C'_1 \cup C'_2 \cup C'_3 \ldots) \cap (D'_1 \cup D'_2 \cup D'_3 \ldots) = \varnothing) \wedge \ldots$ $\Rightarrow (A'_1 \cap B'_1 = \varnothing) \wedge (A'_1 \cap B'_2 = \varnothing) \wedge (A'_1 \cap B'_3 = \varnothing) \wedge \ldots$
$(A'_2 \cap B'_1 = \varnothing) \wedge (A'_2 \cap B'_2 = \varnothing) \wedge (A'_2 \cap B'_3 = \varnothing) \wedge \ldots$
$(A'_3 \cap B'_1 = \varnothing) \wedge (A'_3 \cap B'_2 = \varnothing) \wedge (A'_3 \cap B'_3 = \varnothing) \wedge \ldots$
$(C'_1 \cap D'_1 = \varnothing) \wedge (C'_1 \cap D'_2 = \varnothing) \wedge (C'_1 \cap D'_3 = \varnothing) \wedge \ldots$
$\ldots$

Figure 16

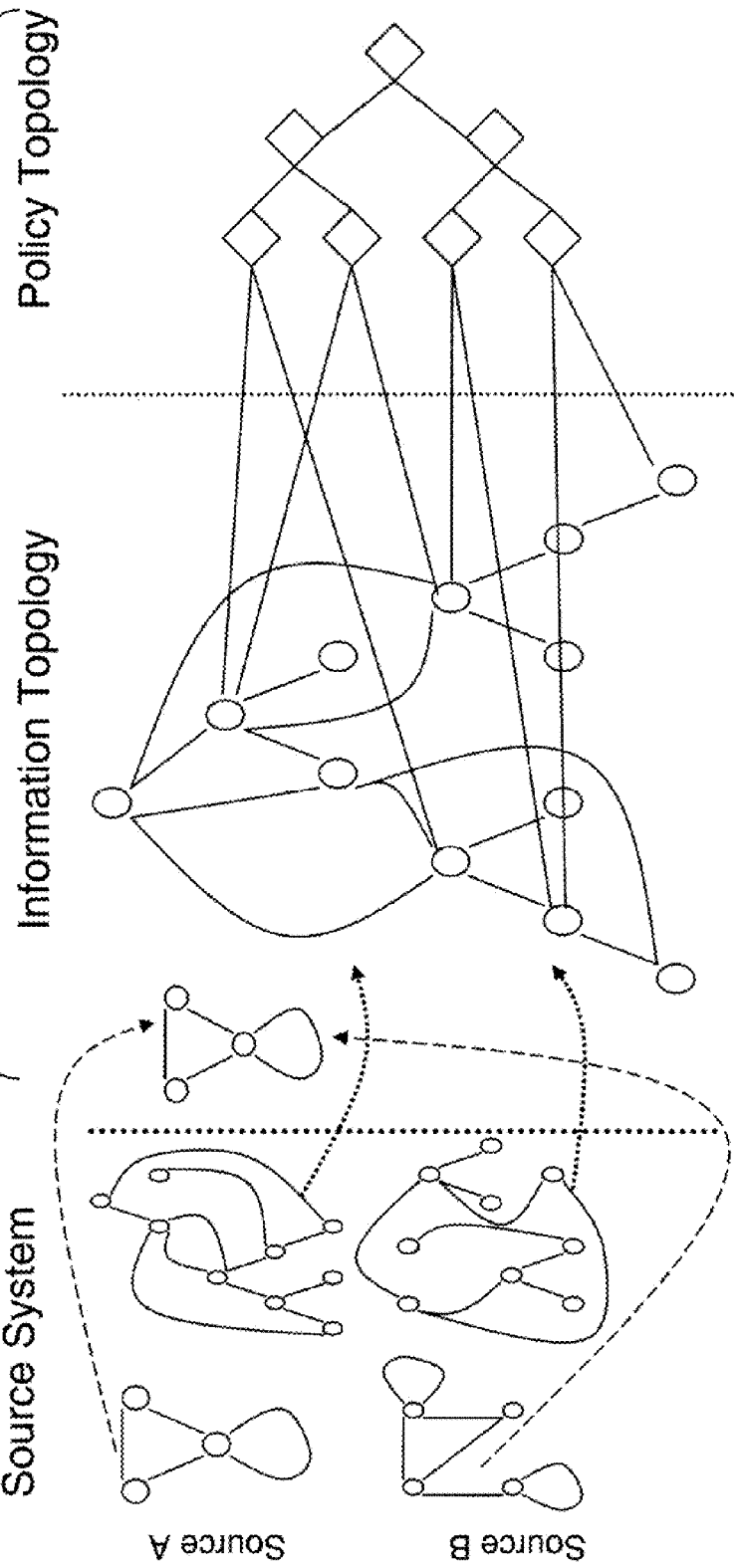

| Column 1 | Column 2 SoD & RM1 | Column 3 SoD & RM2 | Column 4 SoD & RM3 | ... | | Vector |
|---|---|---|---|---|---|---|
| | | | | | | ... |
| $A'_1 \cap B'_1 = \emptyset$ | 1 | | | | | 1 |
| $A'_1 \cap B'_2 = \emptyset$ | 1 | 1 | | | | |
| $A'_1 \cap B'_3 = \emptyset$ | 1 | | 1 | | | 1 |
| $A'_2 \cap B'_1 = \emptyset$ | 1 | 1 | | | | |
| $A'_2 \cap B'_2 = \emptyset$ | | 1 | | | | |
| $A'_2 \cap B'_3 = \emptyset$ | | 1 | 1 | | | |
| $A'_3 \cap B'_1 = \emptyset$ | 1 | | 1 | | | 1 |
| $A'_3 \cap B'_2 = \emptyset$ | | 1 | 1 | | | |
| $A'_3 \cap B'_3 = \emptyset$ | | | 1 | | | |
| $C'_1 \cap D'_1 = \emptyset$ | 1 | | | | | |
| ... | | | | | | |

Figure 28

| Column 1 | Column 2 Classification & RM1 | Column 3 Classification & RM2 | Column 4 Classification & RM3 | Vector |
|---|---|---|---|---|
| ... | | | | ... |
| $H_1 \cap M_1 = \emptyset$ | 1 | | | 1 |
| $H_1 \cap M_2 = \emptyset$ | 1 | 1 | | |
| $H_1 \cap M_3 = \emptyset$ | 1 | | 1 | |
| $H_1 \cap L_1 = \emptyset$ | 1 | | | |
| $H_1 \cap L_2 = \emptyset$ | 1 | 1 | | |
| $H_1 \cap L_3 = \emptyset$ | 1 | | 1 | |
| $H_2 \cap M_1 = \emptyset$ | | 1 | | |
| $H_2 \cap M_2 = \emptyset$ | 1 | 1 | | |
| $H_2 \cap M_3 = \emptyset$ | | 1 | 1 | |
| $H_2 \cap L_1 = \emptyset$ | 1 | 1 | 1 | |
| $H_2 \cap L_2 = \emptyset$ | | | 1 | |
| $H_2 \cap L_3 = \emptyset$ | | 1 | 1 | 1 |
| $H_3 \cap M_1 = \emptyset$ | | | 1 | |
| $H_3 \cap M_2 = \emptyset$ | 1 | | 1 | |
| $H_3 \cap M_3 = \emptyset$ | | 1 | 1 | |
| $H_3 \cap L_1 = \emptyset$ | | | 1 | |
| $H_3 \cap L_2 = \emptyset$ | | 1 | 1 | |
| $H_3 \cap L_3 = \emptyset$ | | | 1 | |
| ... | | | | ... |

Figure 33

SYSTEM FOR ASSESSMENT OF POLICY COMPLIANCE OF AN ARBITRARY INFORMATION TOPOLOGY

TECHNICAL FIELD

This invention relates to representing and assessing compliance of information topologies.

BACKGROUND

As computer networks, computer models, and other systems have become more complex, their reliability has become dependent upon the successful detection and management of problems in the system. Problems can include faults, performance degradation, policy violations, intrusion attempts and other exceptional operational conditions requiring handling. Problems can generate events, and these events can be monitored, detected, reported, analyzed and acted upon by humans or by programs. However, as systems have become more complex, the rate at which events occur has increased superlinearly, making problem management more difficult.

Automated management systems can help to cope with this increase in the number and complexity of events by (1) automating the collection and reporting of events, thereby reducing the load on human operators or programs; (2) using event correlation techniques to croup distinct events, thereby compressing the event stud into a form more easily managed by human operators; (3) mapping groups of events to their underlying causes, thus reducing the time between faults and repairs; and (4) automatically correcting diagnosed problems, thereby minimizing operator intervention.

Event correlation and management techniques are a particularly important method of reducing the number of symptoms in a system which need to be analyzed and accurately determining the number and identity of discrete problems which need to be rectified. Unless events are correlated, a single problem in a single subsystem could result in multiple, uncoordinated corrective actions. This can lead to wasteful resources spent on duplicate efforts and inconsistent corrective actions which result in an escalation of problem.

SUMMARY

A system, method, and program product for representing an information topology on a computer, wherein the represented information topology comprises a plurality of information nodes and a plurality of states, representing a set of polices on the computer, wherein each policy expresses one or more requirements applied to the plurality of information nodes, and assessing compliance of the represented information topology by determining on the computer whether the plurality of states meet the requirements expressed in the plurality of policies.

DESCRIPTION OF DRAWINGS

FIG. 16 illustrates several sets and the policies that can operate on those sets.

FIG. 17 illustrates represents an example of source to normalized transformations where policy has been attached to the normalized information topology.

FIG. 28 is an example of a code book showing how the method of FIG. 27 can be used to assess the policy compliance of an information topology using a vector of symptoms

FIG. 33 is codebook representing how the method of FIG. 32 can be used to assess the policy compliance of an information topology using a vector of symptoms Like reference symbols in the various drawings indicate like elements.

DETAILED DESCRIPTION

The methods and apparatus of this invention may take the form, at least partially, of program code (i.e., instructions)

embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission; and may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 1:
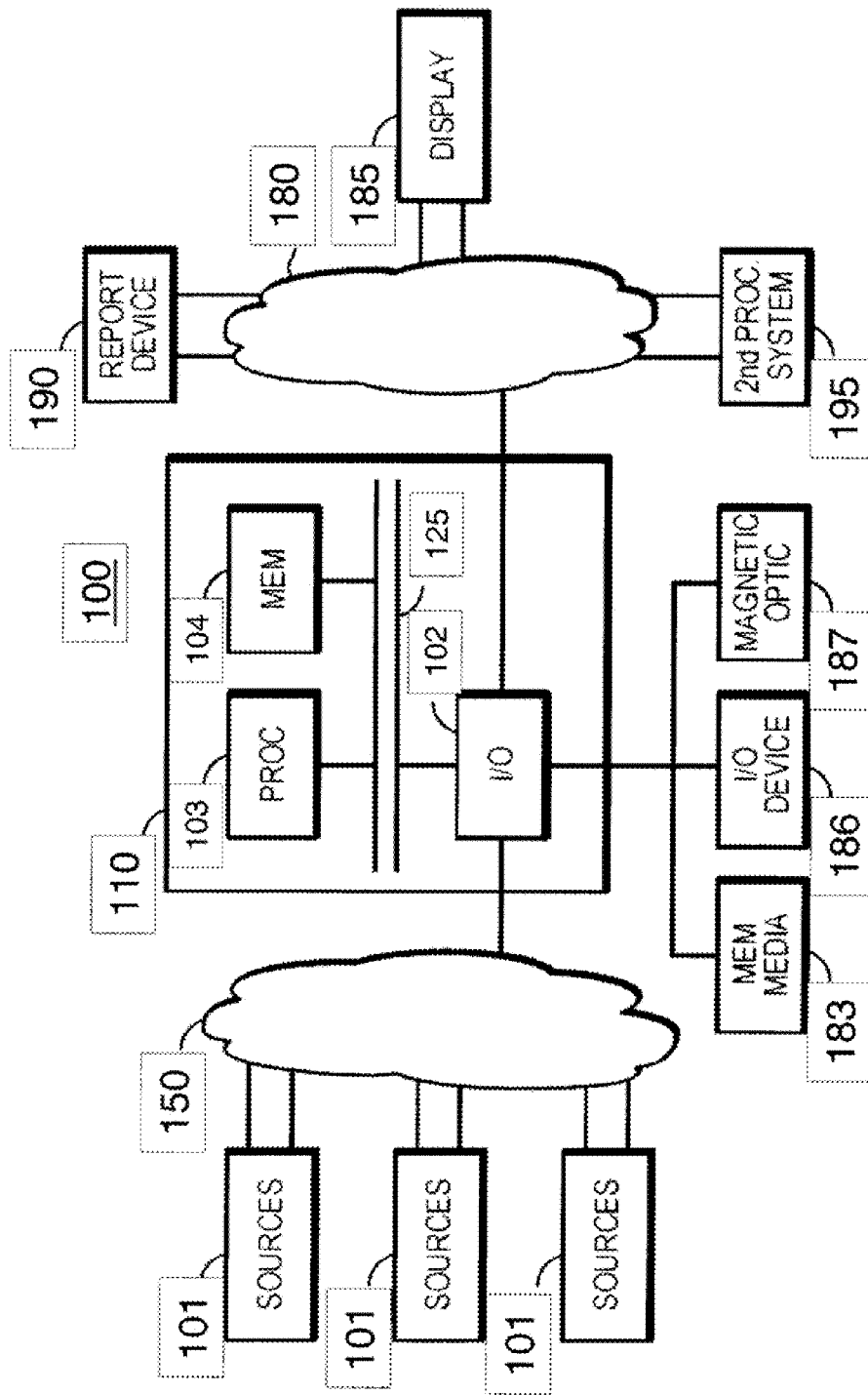
FIG. 1 is an embodiment of the invention on a computer.

The logic for carrying out the method may be embodied as part of the system described below beginning with reference to FIG. 1, and which is useful for carrying out a method described with reference to embodiments shown in, for example, FIG. 6, and FIG. 7, or FIGS. 19-21. For purposes of illustrating the present invention, the invention is described as embodied in a specific configuration and using special logical arrangements, but one skilled in the art will appreciate that the device is not limited to the specific configuration but rather only by the claims included with this specification.

As described below, a technique is provided that may be used for representing and assessing compliance of an information topology to certain policies. Modeling the physical resource topology for the purpose of providing management services to IT operations personnel is a known concept for EMC, the assignee of record in this application. The EMC product Smarts® offers the ability to model resources such as hosts, storage devices, ports and switches and their connectivity relationships so that root causes of observed problems can be determined and the impact of changes in a complex IT environment can be determined with more certainty and before those changes are implemented. An example of modeling resources and root cause analysis can be seen in U.S. Pat. Nos. 7,003,433, 6,868,367, 6,249,755 5,661,668, and 5,528,516, issued to Yemini, Y., which are incorporated by reference herein.

In a preferred embodiment of the technique, the information topology may be modeled instead of the physical topology. In one embodiment, the logical information topology represents a of set of tangible information objects such as documents, emails, web pages and database records, and the relationships between these, and other related objects, such as users, groups, applications, policy administration points, State Control Points, and policy enforcement points. A state control point may be a node in a source system, which due to its actual state, should be represented in the normalized information topology; as it represents a point of configuration for a set of resources in the source system where all of those resources share common state. A policy control point (PCP) may be a particular type of instance of a state control point. The information topology can then have a variety of policies applied against it to help the business appropriately manage their crucial information resources.

For example, in at least one implementation, a technique, implemented by the logic of the preferred embodiment and as described below, may assess how well an information topology and the associated IT infrastructure complies with a set of stated information management policies, on a cross-application, cross-platform basis. These policies may include, but are not limited to, content management policies such as categorization, security policies such as confidentiality, privacy, integrity, user authentication and authorizations, required system configurations, or others. The system may assess the comparison between the actual state and capabilities of the information topology, and the required state of that topology, as expressed in a set of predicate logic conditions. The system may determine the existence of, and extent of, any compliance gap. The system also may provide the operator with information that aids in the identification of the root cause of the compliance gap, as a means towards remediation.

Previous systems have been developed to manage uniformity of technical configurations of individual systems in an IT infrastructure. Previous systems usually examine technical configurations on a system-by-system or per-system basis. However, the previous systems do not typically assess conformance with a business or application policy, which governs the aggregated information topology, or the combined functional use of a collection of distinct applications, information repositories, and/or infrastructure elements. As well, previous systems are not known to automatically correlate related policy requirements across different platforms and arbitrary business applications to assess their aggregated effects.

Previous systems monitor user activity on a network or host via log management, and can report on events that violate a stated policy condition, such as a particular user identity not being permitted access to a specific hostname or IP address only after such policy violations have occurred. However, these previous systems do not usually provide any insight into the compliance of the overall information topology, and do not provide any capability to manage the higher-level policies that govern that overall topology. They also do not typically provide governance for application functions, across application environments, in a comprehensive cross-platform way. Finally, existing systems do not typically provide any mechanism to determine the most probable cause of or source of a policy compliance gap in a complex information and policy topology.

Conversely, a feature of the disclosed technique is that it can assess policy compliance with a business or application policy, which governs the aggregated information topology, or the combined functional use of a collection of distinct applications, information repositories, and/or infrastructure elements. In an embodiment, the disclosed technique may operate on the aggregate information topology, in a cross-platform, heterogeneous environment, even before actual policy violations occur. The disclosed technique does not require any common event taxonomy. It also does not require the participating systems to agree on or share a common policy language syntax, or semantics. Nor does it require coordination between each of the organizations managing the independent systems. The normalized information topology can include specific business application functions as well as information objects. Thus, an application resource can be included that is a "calculate amortization" function, not just the amortization table data.

The disclosed technique may improve an administrator's understanding of the information topology, the information and relationships between information being managed by and in the IT environment. An embodiment of the disclosed technique can provide an indication of the root cause of a policy violation, rather than simply identifying that a violation has occurred. That is, an embodiment of a technique may assess the compliance of the aggregated information topology and may map non-compliance back to the cause of the non-compliance in the source model(s); further, the specific point(s) of non-compliance in that source model or models can also be identified. Each of a set of individual systems may operate independently of one another and each member of the set, by themselves, are unable, to ascertain the root cause of a policy violation. This can be because the violation can be caused by interactions of one system with another system, where the different systems may have no knowledge of each other.

In an embodiment of the instant technique, a method and system enables an arbitrary policy assessment to be performed against any arbitrary collection of heterogeneous information systems. That is, a method, system and apparatus are provided to enable determination of whether or not an organization's information management, communication, storage and processing systems are appropriately configured and operating in compliance with a set of policy requirements, which can be represented canonically. If the systems are not in compliance with the stated policies, an embodiment can provide a root cause analysis that enables the cause of the non-compliance to be traced back to the original system or systems; which can be a first step towards remediation of the non-compliance condition.

An embodiment of this technique allows the current invention to function with numerous systems and information objects in those systems. This may be done by creating a model representing the information objects that exists on the actual systems, which can allow for greater scalability. This representation is a logical information topology that serves as a model of the actual information objects on the source systems. An assessment can also be on the logical information topology. The conclusion reached for the assessment of policy compliance of the representation can then be applied to the actual systems.

The information topology contains a representation of the actual information objects being assessed that is more manageable in terms of scale and complexity, but is sufficiently detailed to perform the particular measurements that are required to provide the desired policy compliance assessment. The present disclosure describes various techniques that may be employed to derive an appropriate information topology for any given environment. For example, the information topology model may be optimized for this purpose by choosing to selectively aggregate some of the actual information objects, and some of the attributes of those actual information objects. The details of the optimized information topology model used for any particular assessment may vary depending upon the specific systems being assessed and the specific policy compliance aspects of interest.

Another embodiment of the current technique can acknowledge and account for each information system or target system, which may be referred to as Resource Managers (RM), having its own local information management model. That is, the conceptual model, and the end user or administrative use cases supported when using these systems, may all differ significantly (Windows and Mac OS X are both computer operating systems, but these support very different concepts and functions from the point of view of the users). This presents a complexity when assessing the overall compliance of the complete information topology. For example, consider the challenge of ensuring that a particular file stored on one system is protected with equivalent access control policies when an equivalent (or congruent) form of that same information exists on another system. The two systems could have different file systems, and different security mechanisms, and different capabilities for expressing and enforcing their local policies. To ensure compliance, it may be necessary to ensure that any file is being stored, processed and otherwise handled on each separate RM system in a way that is consistent with a single, independently stated canonical policy.

In general, the information topology may be a graph that may be made up of nodes which represent the selected or aggregated information resources, and relationships between these nodes that represent behavioral semantics. The nodes in the information topology can capture state information of the resources, and the relationships between the nodes define how the states of the connected nodes impact one another. In a physical resource topology such as the type that is traditionally managed by EMC Smarts®, the nodes represent physical assets such as routers, switches, storage arrays, hosts and the typed relationships that connect these represent concepts such as "connects", "serves", "contains."

In contrast, in an information topology, the graph may be used to capture the existence of and relationships between information objects and the related resources. In an information topology model, the nodes may be entities such as files, folders, databases, URLs (or URIs), application function points, transactions, users, and user groups, and the typed relationships between these entities model behavioral semantics such as "containment" (i.e. documents are contained in folders, users may be contained in user groups), "inherits" (i.e. a document may inherit the availability requirements set on the folder where it is contained), as well as access control and authorizations, or levels of classification. The information topology may provide a unified view of the information resources that exist across the actual heterogeneous systems environment that would otherwise not be available, enabling a more efficient and effective policy assessment process.

The present disclosure describes a generalized framework within which an appropriate information topology model as well as a normalized information topology instance that may be based upon that model is created. The appropriate information topology may be created from an actual information systems environment. The information topology can be used to accomplish the desired policy assessment(s) against the information topology for the purposes of visualization, root cause analysis of non-compliance conditions, and impact analysis for changes to the actual environment.

Refer to the process of analyzing the actual target systems for purposes of creating the information topology as information topology discovery; the target system may also be referred to herein as a Resource Manager. The discovery processing that may be performed against the Resource Managers (RMs) may be done before the policies to be assessed have been specified. As well this discovery processing may be done subsequent to the definition of the specific policies for which compliance may be assessed. Once the information topology has been defined and instantiated, it may then be kept in synchronization with the Resource Managers which it represents. The level of consistency maintained between the information topology (as a logical model of the information objects in the real world) and the actual information objects at the resource managers can vary with the policy assessment(s) being performed.

For example, the data may be continuously updated as changes occur, at a set period of time, or otherwise as dictated to perform a successful analysis of compliance. The mechanisms used to maintain consistency between the information topology and the actual state of the information objects at the resource managers may vary. In a preferred embodiment the techniques of event-driven, incremental change data capture (CDC) and change data propagation (CDP) may be applied. The incremental changes made to information objects and the associated metadata which may be relevant to the specific policy assessment may be intercepted at the various source Resource Managers and these may be transformed as necessary and may be applied to the appropriate part of the information topology.

In a preferred embodiment, the information topology instance that can be created using this method may be deployed into a system such as EMC Smarts®. Among other capabilities, the Smarts® system provides a component called a Domain Manager. The Domain Manager implements a correlation engine that includes algorithms that perform deductive and inductive logic and these can be applied to the information topology for the purpose of performing the policy assessment and the root cause analysis of any non-compliance, as well as impact analysis of changes.

Another feature of the disclosed technique is the ability to predict the policy compliance impact that would result from an arbitrary administrative change in a given environment (impact analysis). The disclosed technique enables improved policy compliance in a complex information topology by effectively automating manual testing that would otherwise be done by a human auditor. This can reduce the costs of achieving compliance, and proving compliance, and can also reduce the window of vulnerability between the occurrence of a policy violation and the remediation of that condition. The examples of the technique and how it may be implemented may be better understood by considering the examples presented herein.

Information Topologies

Figure 2:
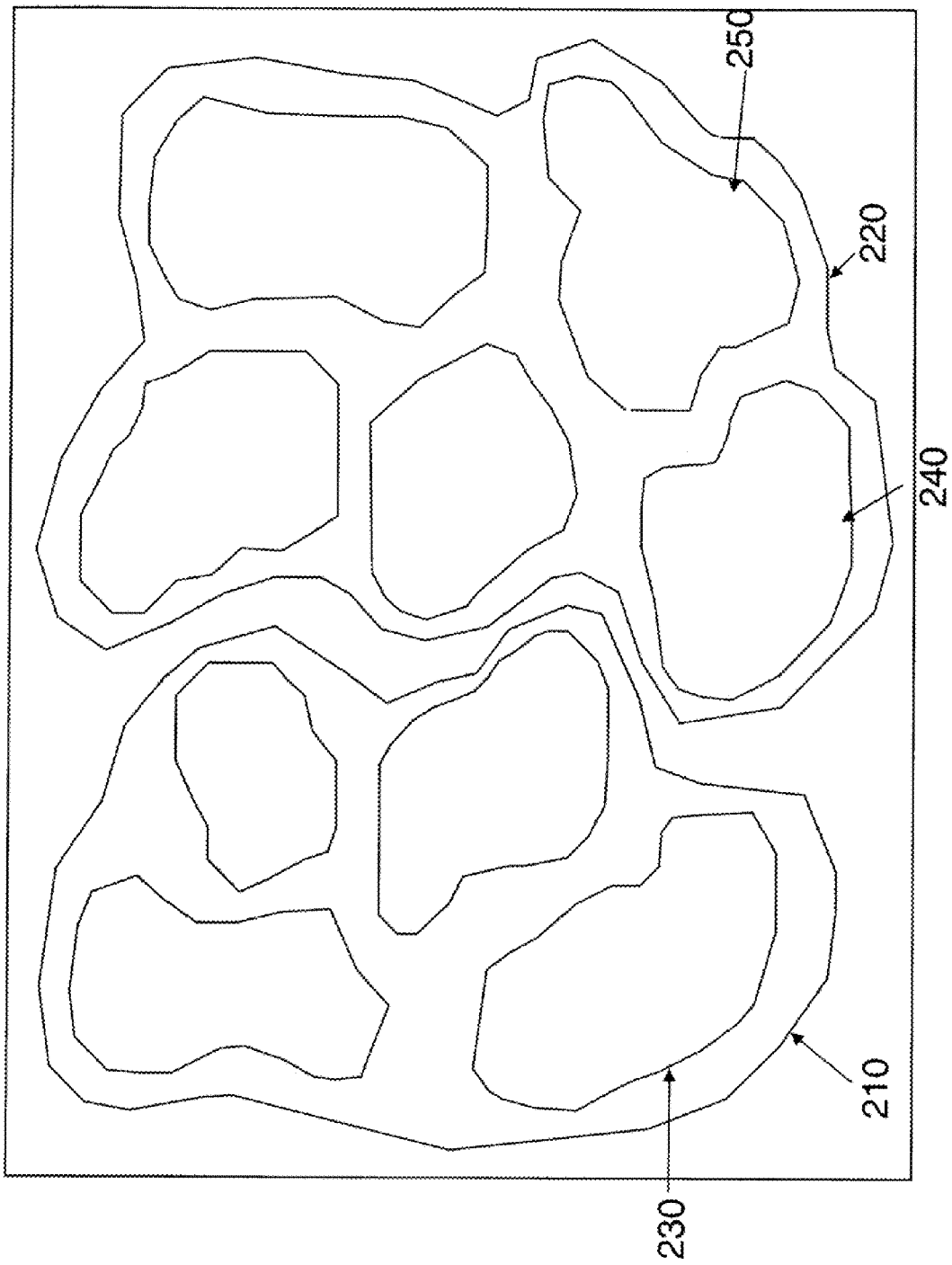
FIG. 2 is an example of a representation of a topology.

Referring to FIG. 2, topology boundary 210 may delineate the extent of information in a particular source managed by a resource manager. Within source boundary 220, resources 240 and 250 represent sets of information resources where all members of a set depicted within resource 240 and 250 share some common state. As explained herein, source boundary 210 and 220 can represent different resources or sets of resources managed by Resource Managers. Resources 240 and 250 represent groupings of particular resources that may be managed by the resource manager for that model topology and the resources within those groupings share some common state. The type of the resources may vary by source where resources 230, 240, and 250 could be, for example representations of documents, folders, MP3 files, or other information or functions. As well, each resource has a state, which in topologies boundary 210 and 220 may be defined as the logical or physical location of each resource. Conversely, in other models the state may be access control settings or document retention requirements, audit requirements, or availability requirements.

Figure 3:
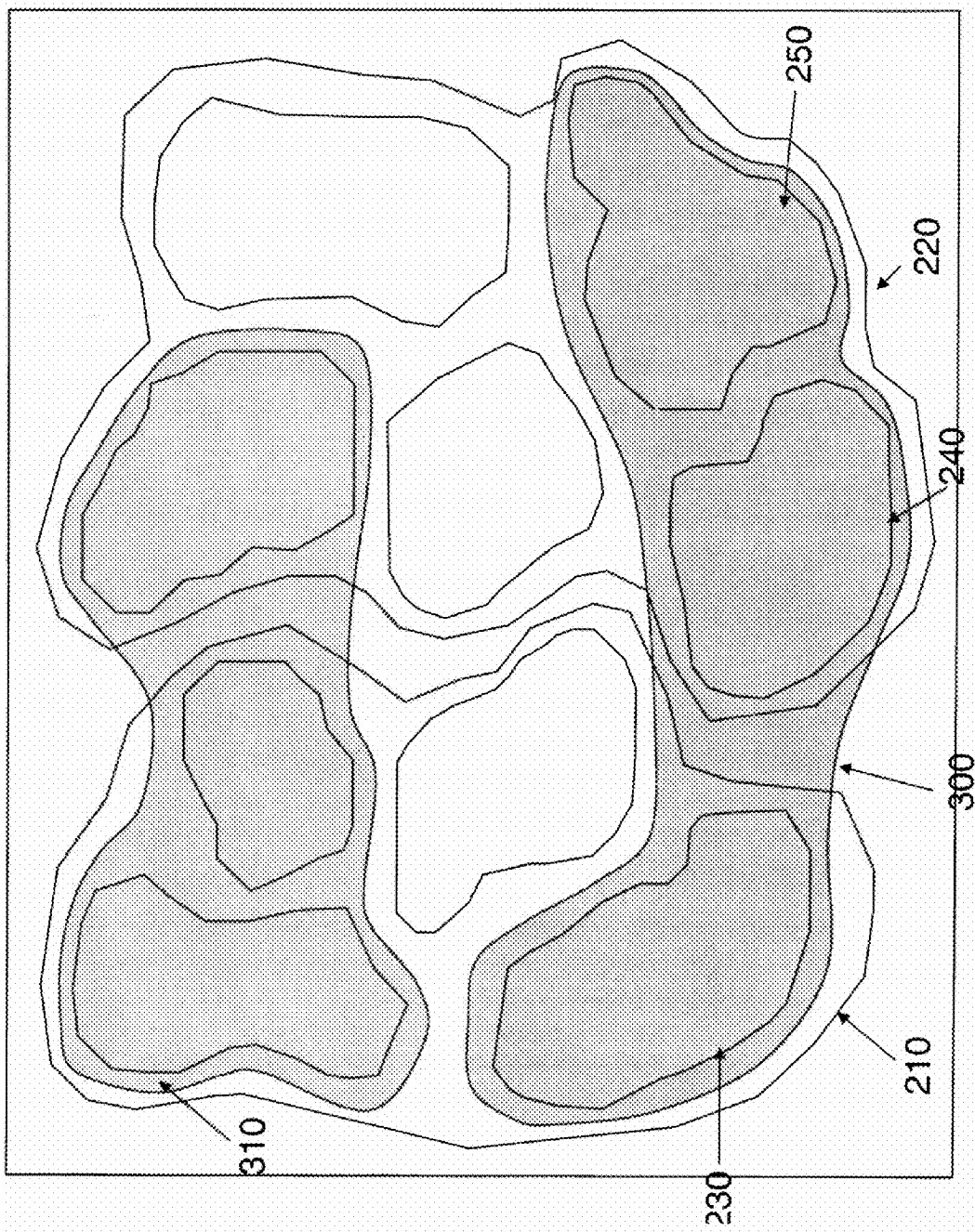
FIG. 3 is an example of the information of FIG. 1 topology where the information in the topology has been aggregated according to a criterion.

Referring to FIGS. 2 and 3, groupings 300 and 310 may represent the sets of information objects targeted with a particular policy. The overlay represents the scope of a particular policy or policies, applied to the information source, that spans resource managers. The criteria for such a grouping may be the nature and scope of the policy to be assessed, and the actual state attributes of the resources.

Common Information Topology

Figure 4:
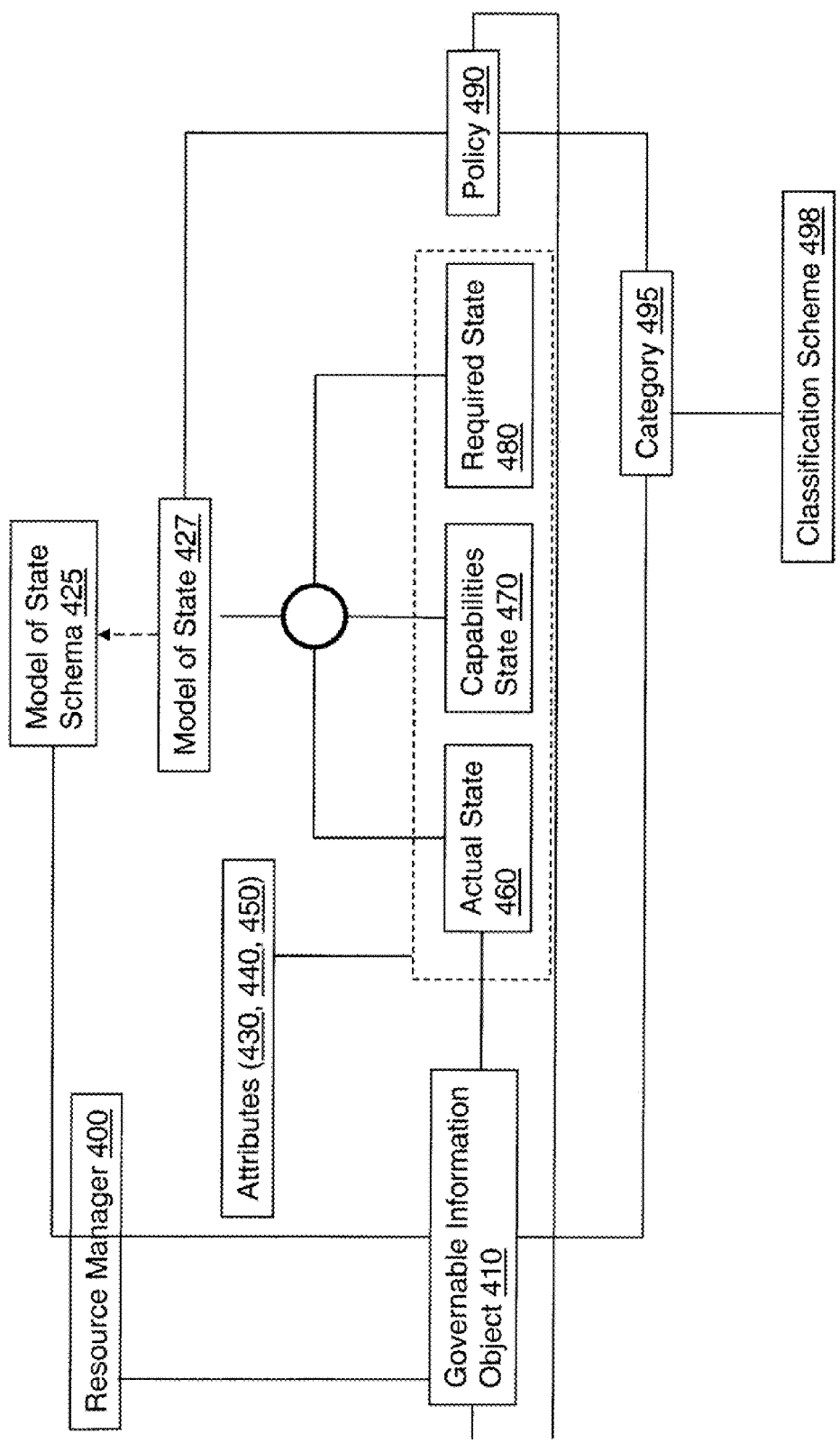
FIG. 4 illustrates a framework useful for representing and assessing a normalized information topology.

In a particular embodiment, the conceptual model represented in FIG. 4 serves as a useful framework for analyzing a policy compliance problem, and thereby performing the methods of this invention. Governable Information Object (GIO) 410 may represent the tangible resources in source systems that can be represented in the common information topology. Instances of GIO 410 within an implementation of this embodiment may be, but are not limited to, files, sets of files, e-mails, sets of emails, or log files. For a separation of duties problems, examples of GIOs may be any of these, as well as documents and or user transactional functions in specific business applications and files.

Referring to FIG. 4, the model of state schema 425 describes the types of attributes that the model of state 427 may contain. The model of state 427 may be the set of actual types and values that sufficiently describe the GIO 410 for any given state assessment. The group of attributes 430, 440, 450 contained in a model of state (MoS) 427 may follow the model of state schema 425. For example, if the MoS was for an E-mail, attributes could include sender, recipients, the date sent. As well, the MoS 427, in an implementation, may represent an actual state of a GIO 410 as well as a set of requirements for a policy 490 that governs that GIO 410. The link to policy represents the notion or concept that the policy will function by comparing two instances of model of state for a given GIO. The policy may compare the actual state attribute values to the required state attribute values, or requirements to capabilities or any combination of comparisons therebetween including comparing actual states to other actual states. As such, Attributes 430, 440, and 450, in addition to representing actual information about a GIO, can also represent an expression defining capabilities for that GIO or requirements for that GIO.

For example, Actual State 460 may represent a set of attributes and associated values for a given GIO. It can be a collection of metadata and state attributes for a GIO. Capability State 470 may represent some set of abilities that are associated with a GIO. Requirements 480 may represent an idealized or desired state of a GIO. Requirements can be compared against an Actual State to determine compliance with a Policy 490. Category 495 is a categorization of GIOs. That is, one more or more GIOs may belong to a particular category. Each category represents a grouping of GIOs to which a set of policies may be applied. Within the model, each policy can be represented as a predicate logic expression.

Figure 5:
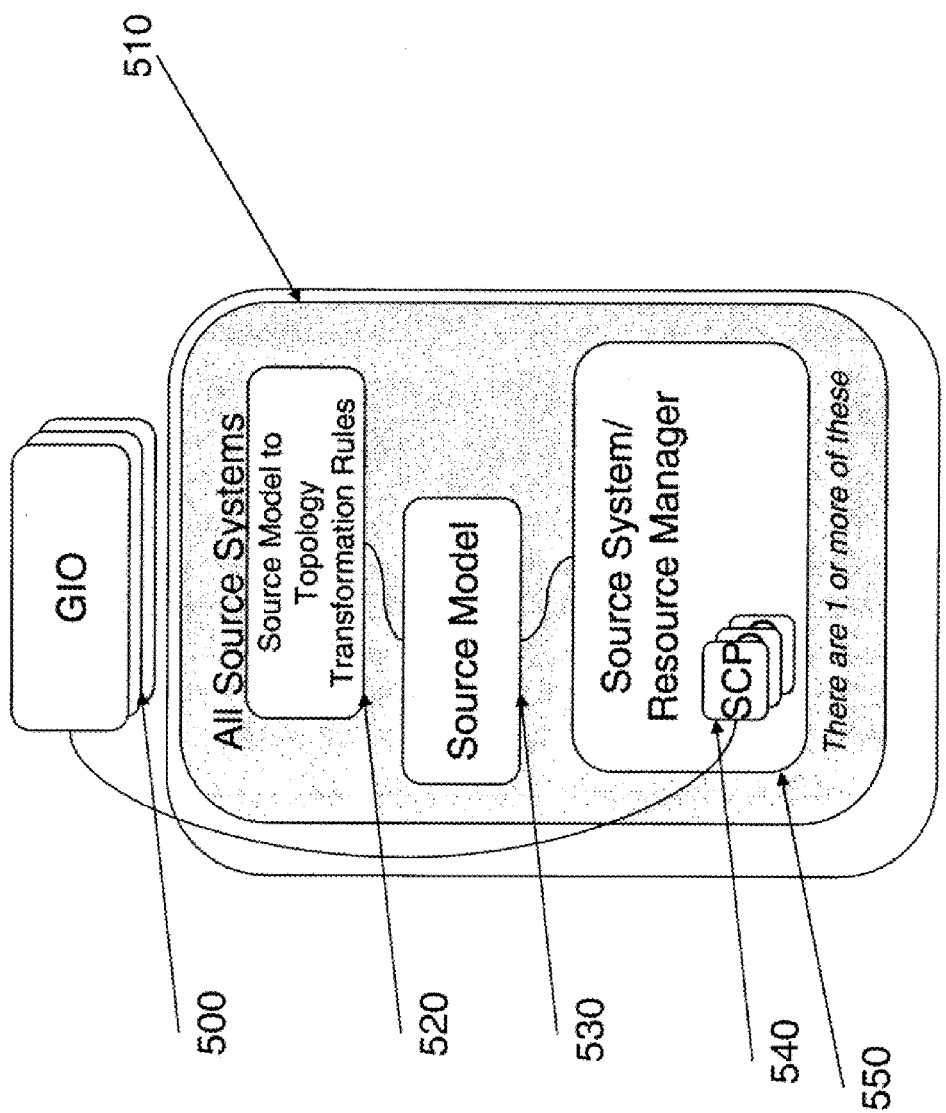
FIG. 5 is an example of a set of source systems 510, associated GIOs, a source model, and transformation rules.

Refer for example to FIG. 5, which shows an embodiment of a set of source systems 510, associated GIOs 500, a source model 530, and transformation rules 520. Source systems 510 represent the source systems to be represented in a particular common information topology. For each source system, such as source system 550, in this embodiment, there is a source model, such as source model 530. As well, there may be GIOs 500 that are managed by different source systems or resource managers, such as 550. GIOs 500 can span resource managers although a resource manager may not be aware of other resource managers or that a GIO exists across both resource managers. GIOs 500 can relate to other GIOs in different ways, i.e. a GIO might contain other GIOs, a GIO might be a subset of the union of a set of other GIOs, or a GIO may represent a collection.

In the case of a collection GIO, the specification of the collection may consist of an enumeration of instances or a selection criterion to qualify the members of the collection. For example, "all of the documents authored by a particular author" could be a particular collection. This collection of documents by an author likely spans many individual documents across many RMs, but may constitute one GIO.

Further, in selected embodiments, some of the GIOs are special in that they may be control points. For example, a control point may be a collection GIO where a part of each GIO's state is set the same for all GIOs in that collection. In some embodiments, a control point may exist within a resource manager; that is, the special type of GIO that is a control point does not span multiple resource managers. Generically, the control points may be referred to as State Control Point (SCP) 540. A Policy Control Point (PCP) is a type of SCP 540 where the state that is being set is a policy—i.e. Access Control Policy.

Figure 6:
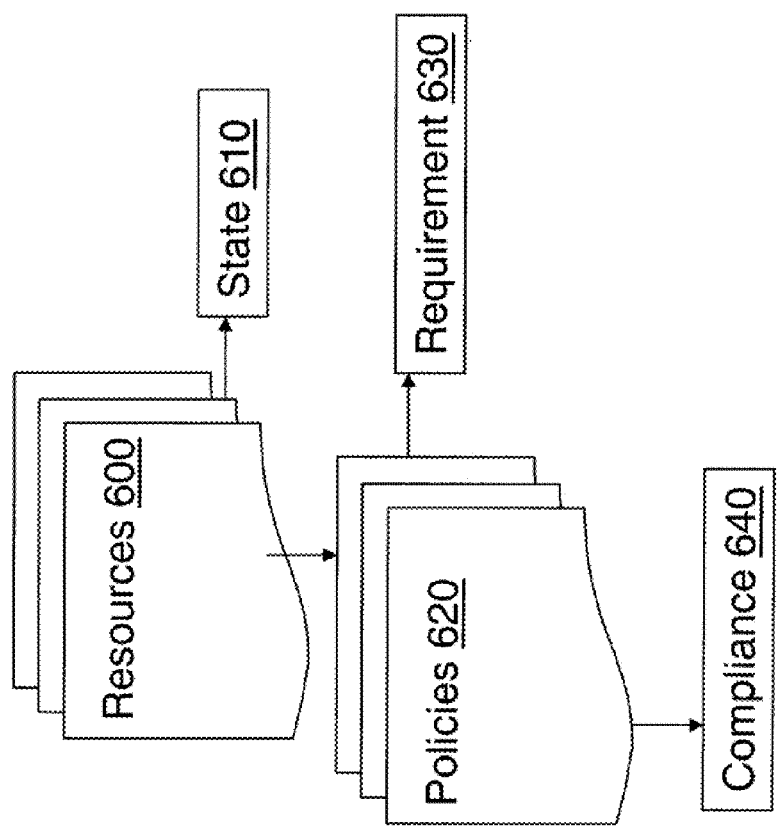
FIG. 6 is an example of resources and policies in the current technique.
Figure 7:
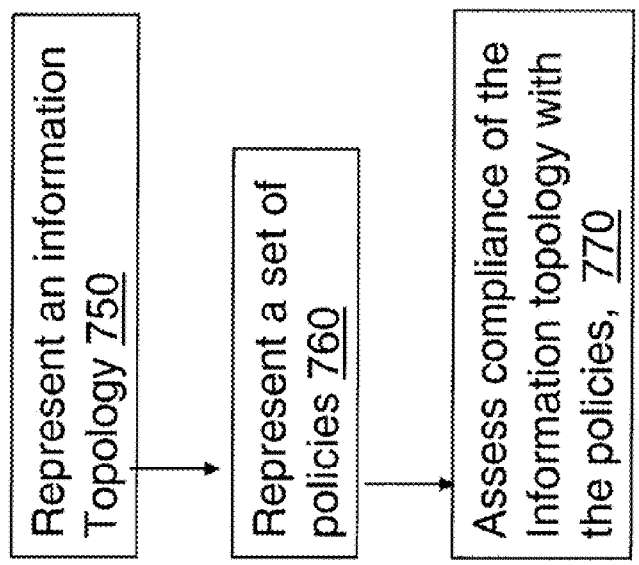
FIG. 7 represents an embodiment of a method of the current technique.

FIG. 6 represents an overview of an embodiment of this technique. FIG. 7 represents an embodiment of a method of this invention. Referring to both FIGS. 6 and 7, given a plurality of resources 600, these resources are represented within a common information topology as shown by step 750. Each resource 600 also has state 610. In step 760, a set of policies, 620, are represented, where each policy 620 expresses one or more requirements 630, which can be applied to the resources 600. In step 770, compliance of the information topology may be assessed by determining whether the states 610 of the resources 600 meet the requirements 630 expressed in the policies 620.

Figure 8:
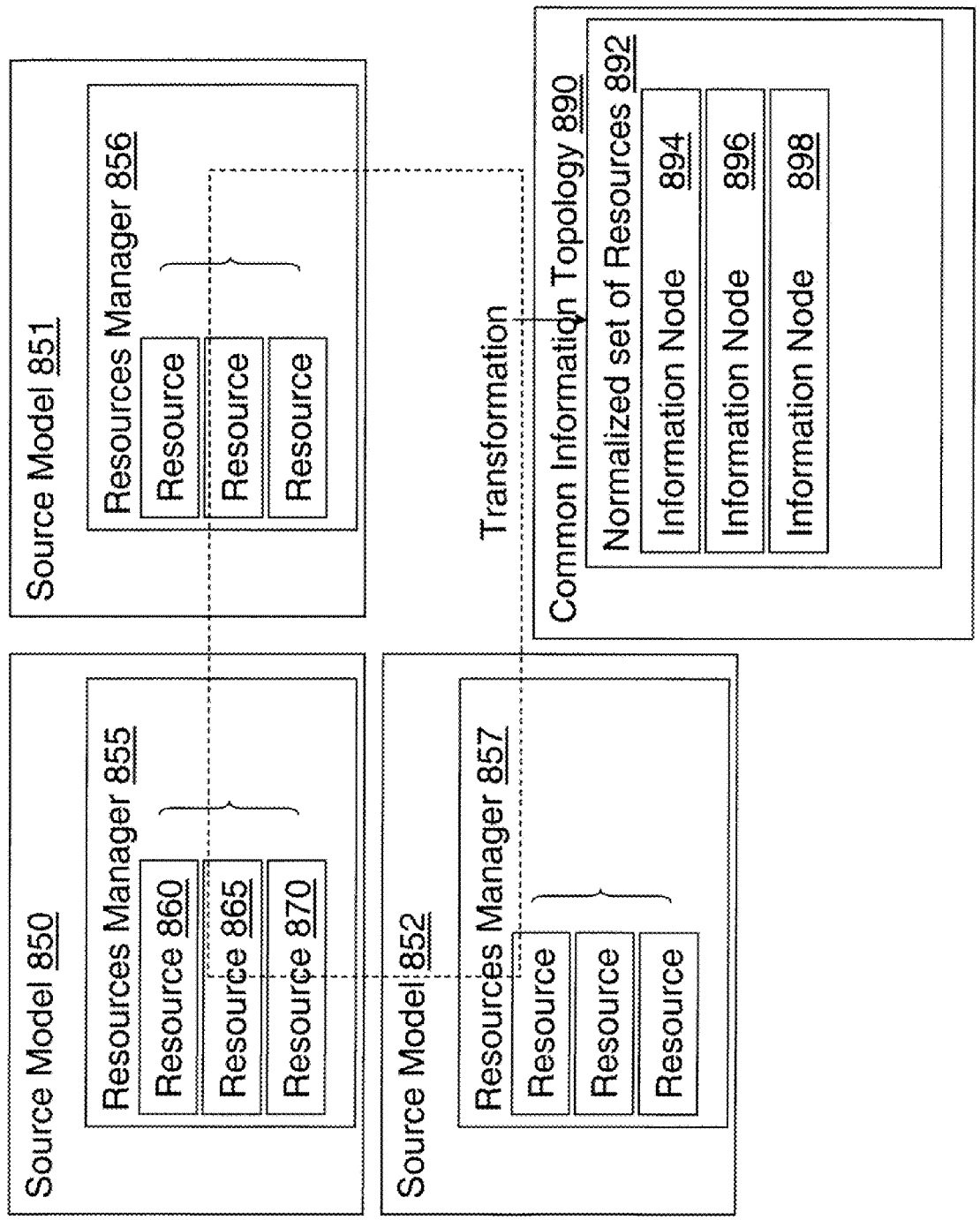
FIG. 8 represents an embodiment of source models mapped to a common Information Topology.

For example, FIG. 8 illustrates an embodiment of the source models 850, 851, and 852, which could correspond to the source models of FIG. 5, mapped to a common Information Topology 890. Source 850 is managed by a resource manager 855. Resource Manager 855 manages resources 860, 865, and 870. In FIG. 8, Common Information Topology 890 has Normalized set of Resources 892. Normalized set of Resources 892 comprises Information Nodes 894, 896, 898. The Normalized set of Resources 894, 896, 898 represent a transformation of resources from the Resource Managers 855, 856, and 857. The transformation aggregates and normalizes the resources from each of the resource managers 855, 856, and 857, into normalized resources 892.

Figure 9:
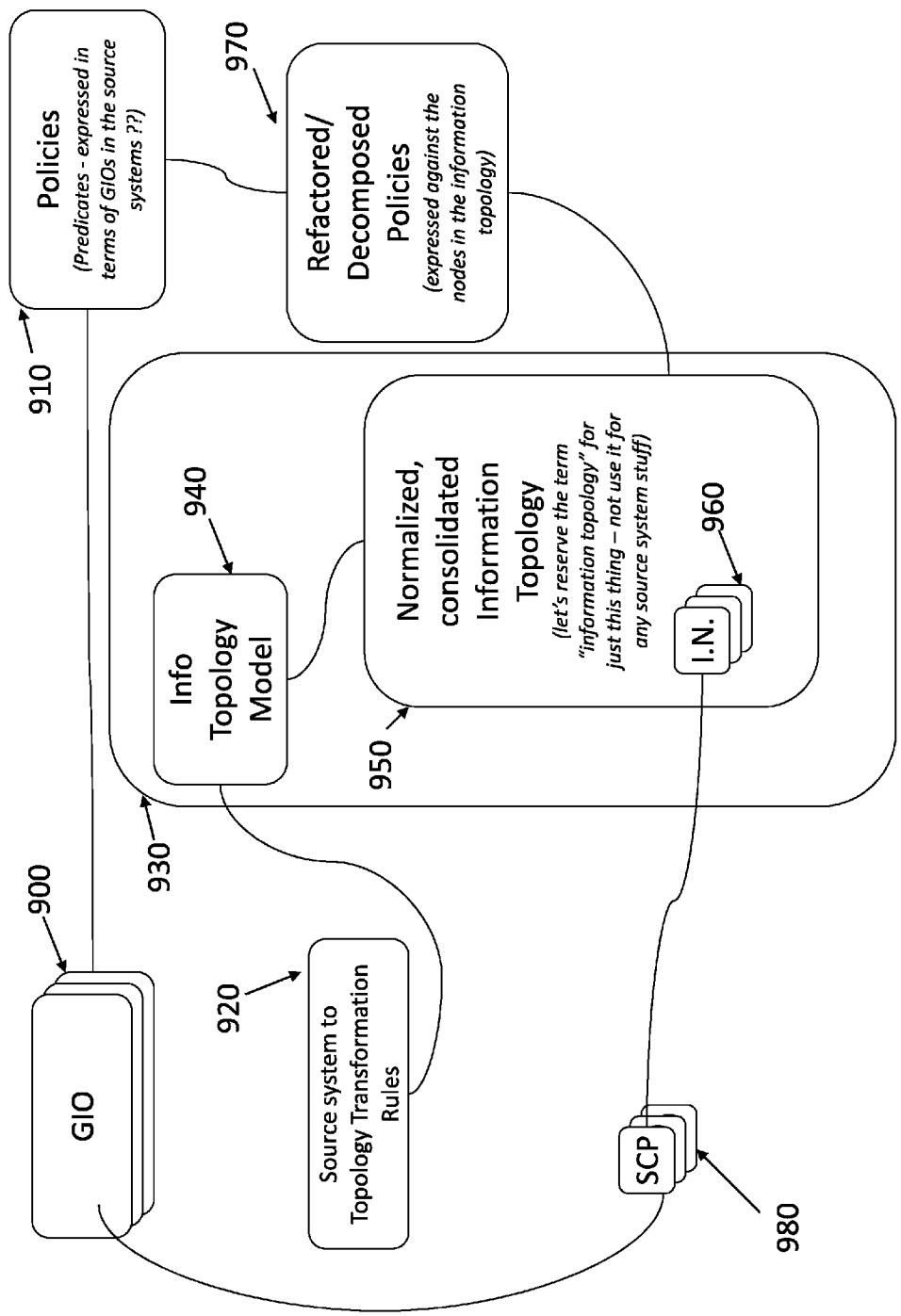
FIG. 9 represents another embodiment of the current invention with respect to mapping GIOs to the Common Information Topology.

The embodiment of the relationships expressed in FIG. 8 can also be seen by examining FIG. 9. FIG. 9 shows that some IOs 900 in the source systems are represented with Information Nodes (I.N.) 960 in the information topology 950. In this embodiment, these GIOs 900 correspond to State Control Points 980 that are judiciously chosen for representation in the Information Topology, from all of the nodes present in the source systems, however the Information Topology 950 may also include some Information Nodes 960 that correspond to GIOs 900 that are not SCPs 980. Again, however, it is important to note that the GIOs 900 selected may be a reduced set of all GIOs 900 in the source systems. In at least some embodiments, the GIOs 900 selected are those necessary to represent the information in a common information topology 950 and perform a specific analysis on that information topology 950. By having a reduced representation, an aspect of this invention can transform an otherwise unmanageable set of resources into a smaller manageable set capable of having analysis performed on them.

For each source system model there may be a set of transformation rules 920 that relates the source system model to the information topology model 940. The set of transformation rules 920 may be used to transform an instance of a GIO 900 in a source system to an I.N. 960 in the information topology 950. Policies 910 are expressed in terms of GIOs 900 in the source systems. Refactored or decomposed policies 970 equivalent to these policies 910 are expressed in terms of the nodes 960 in the information topology 950. The refactoring is driven by the relationship of the GIOs 900 to the carefully chosen SCPs 980 to which the policies 910 apply and the transformation rules 920 which map GIOs 900 to I.N.s 960.

Figure 10:
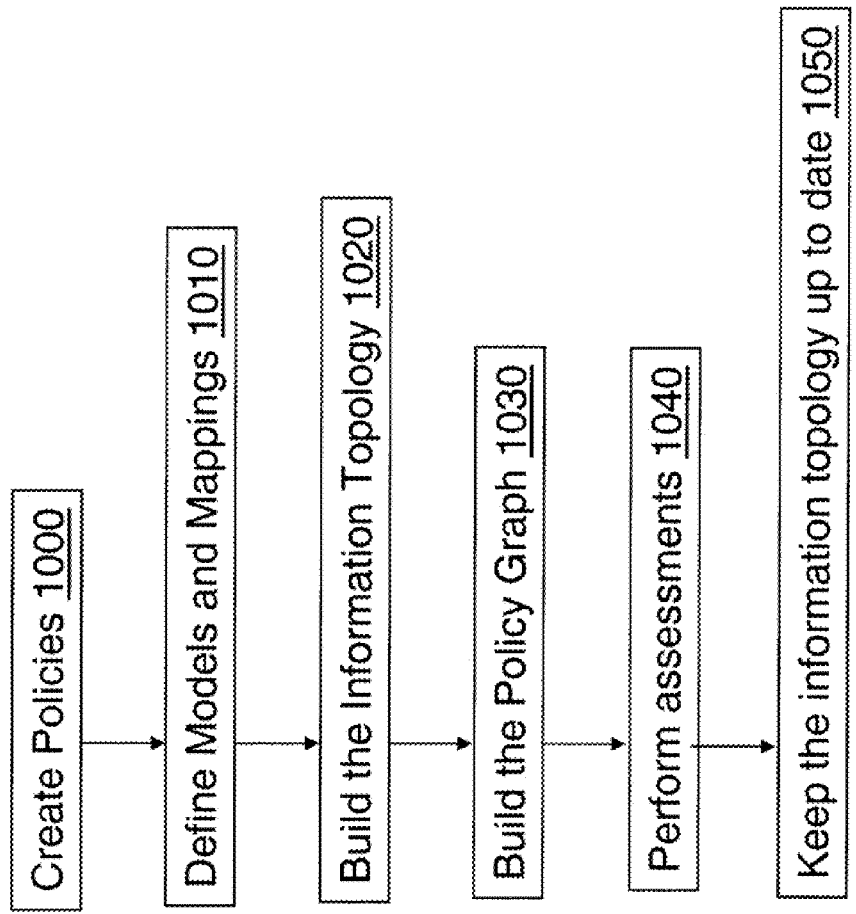
FIG. 10 represents an embodiment of a technique of the current invention.

A particular embodiment of the current technique is now described. FIG. 10 provides an overview of this embodiment. Policies are created 1000. The model is defined and mappings are created 1010. The information topology is built 1020. The policy graph is built 1030. The assessments are performed 1040. As well, the information topology is kept up to date 1050. In another embodiment illustrated in FIG. 11, the creation of the policies 1000 of FIG. 10 may include representing a policy in natural language 1100, restating the policy in predicate logic, 1110, and identifying specific GIOs to for the policies to be applied 1120.

Figure 12:
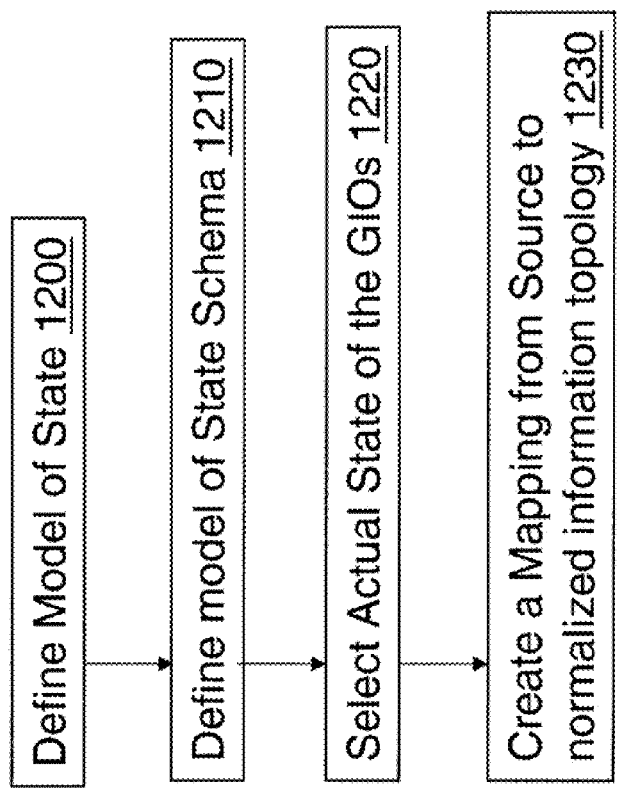
FIG. 12 represents an embodiment of the model definition and mapping creation of FIG. 10.

In the alternative embodiment of FIG. 12, the model definition and mapping creation 1010, may include defining the model of state 1200, defining the model of state schema 1210, selecting the actual state of the GIOs 1220, and creating a mapping from the source to normalized information topology 1230. In yet another embodiment show in FIG. 15, the building of the policy graph 1030 may include, reformulating the policy predicates 1500, identifying the RMs and or SCPs 1510, determine any state mapping 1520, refactoring the policy predicates 1530, and instantiating the refactored policies 1540.

Figure 19:
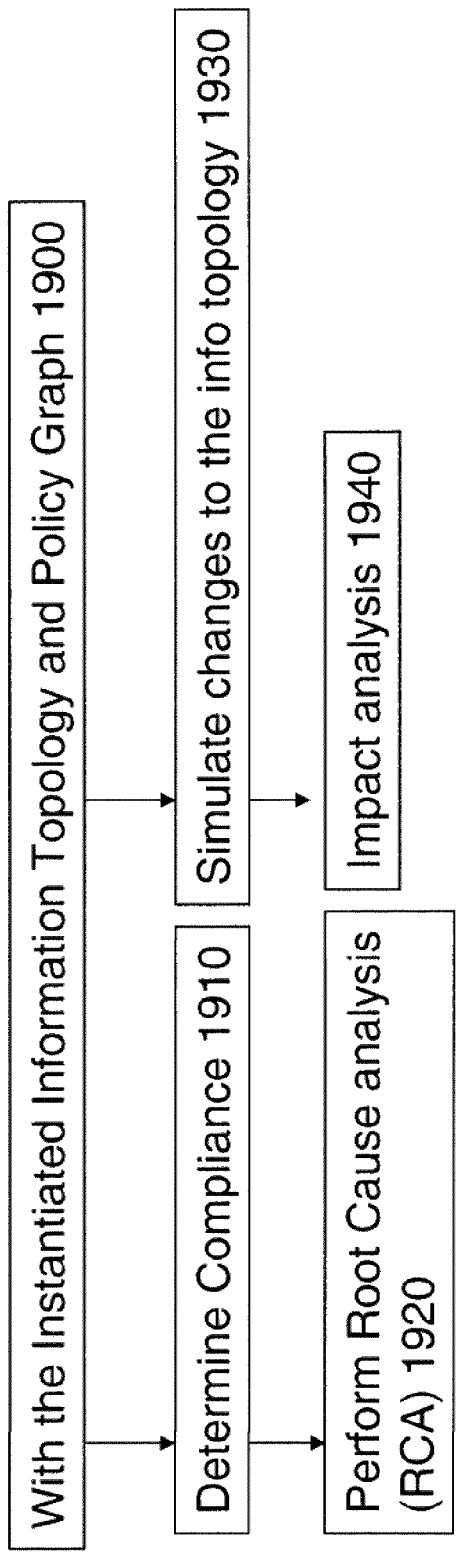
FIG. 19 represents an embodiment of performing assessments of FIG. 10.

In the embodiment of FIG. 19, the policies assessment may include, determining compliance 1910, performing RCA 1920, simulate changes to the information topology 1930, and impact analysis 1940. As well, an embodiment may include, as show in FIG. 20 monitoring resource managers 2000, detecting changes at RMs 2010, performing transformations 2020, and updating the information topology 2030, to keep the information topology up to date 1050.

Create Policies

Figure 11:
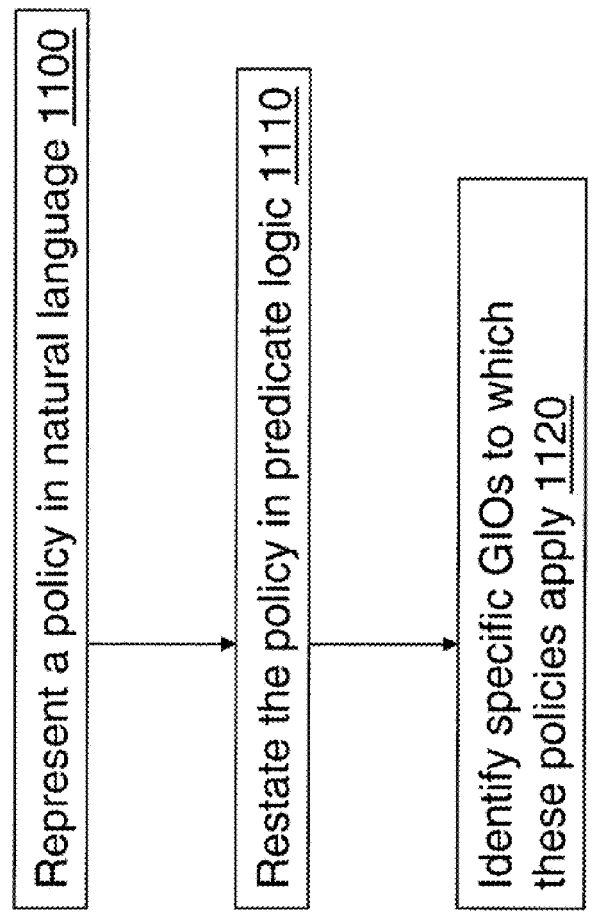
FIG. 11 represents an embodiment of the creation of the policies described in FIG. 10.

Referring now to FIG. 11, the policy that is to be assessed can be represented in natural language 1100. For example, a policy could be a separation of duties policy and that policy could be expressed as the statement that there must be no overlap between the users having access to one set of resources and the set of users having access to another set of resources. A step of an embodiment of the current technique could be to restate this policy in the form of predicate logic 1110. The policy may be expressed in a minimum number of terms and can be made without reference to any particular technology. For example, a separation of duties policy may be expressed as $A \cap B = \emptyset$ where A and B represent sets of objects where there should be no overlap between members of the sets. This step can define the policy or policies to be applied to the information topology to determine if it is in compliance with the policies. Another step can be to bind this policy to specific resources by identifying the GIOs to be targeted with the policy 1120. Yet another step can be to further reformulate this policy with respect to some actual state of those targeted GIOs.

Define Models and Mappings

In order to facilitate the creation of the information topology, several design time activities may occur. Referring to FIG. 12, one design time activity can be to analyze the specific models in which the source systems will present their resources. In an embodiment, the model defines the object model classes and how they relate to one another. Another design time activity can be to determine what specific normalized topology model should be used (i.e. what are the object model classes and how do they need to relate), in order to best represent the various source models to be assessed. Another design time activity can be to define the mappings from the various source models, to the single normalized topology model.

A further step in an embodiment may be to define the Model of State and Model of state schema for the information topology 1200 and 1210. This step may include defining the normalized actual, required and capable states of the GIOs being accessed 1220. With respect to the Model of State Schema, this describes characteristics of the attributes that may make up the model of state, including characteristics such as name and datatype. Therefore, the Model of State Schema, for the separation of duties policy, could be defined to include a collection of strings (datatype) representing the userIDs (name) of the individuals having access to a given resource.

A further step, in an embodiment, may be to define the source-model-to-information-topology model mappings 1230. These mappings can define how the model of state for actual state of an information node in the information topology will be determined from the values of the GIOs they represent. To determine the Actual State of the GIO, a translation may be provided that calculates and returns the state of the GIO from the source model or Resource manager to the normalized model. This translation can transfer the information as managed by the resource manager or model to the form of information used in the normalized model. In some embodiments, the definition of this mapping is a design time activity and application of this mapping is a run time activity; where the actual state of the GIOs can be polled from the resource manager or can be calculated based on information polled for the GIOs, or can be published by the GIOs, or can be calculated based on information published by the GIOs.

Build the Information Topology

In another step of an embodiment of the current technique, the normalized information topology can be discovered and instantiated. This can require that the information resources against which the policy to be assessed applies are identified and transformed into the common information topology. For example, certain resources within resource managers 855, 856, and 857 of FIG. 8 could be selected and those resources could be transformed into information nodes in the common information topology.

Figure 13:
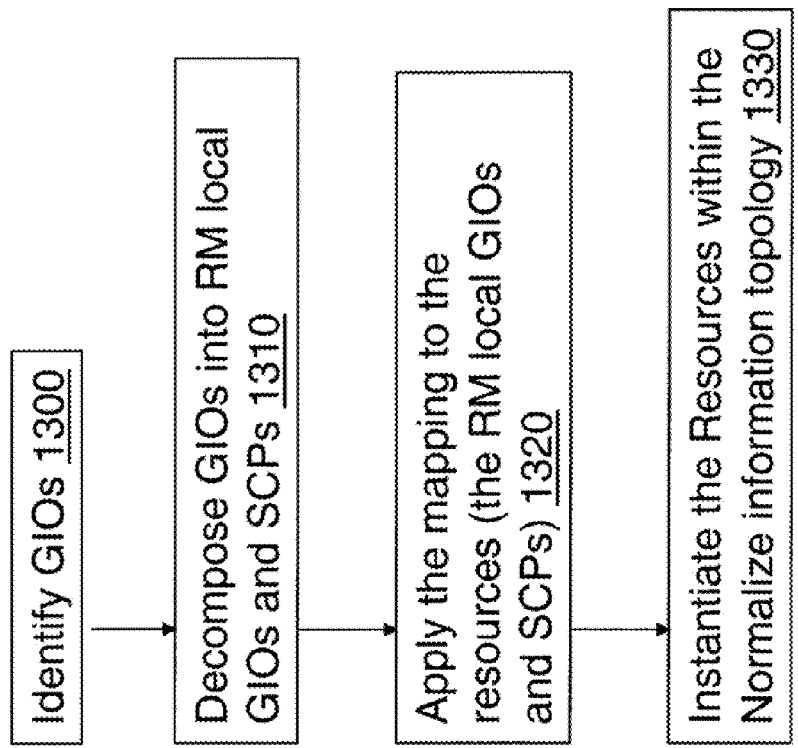
FIG. 13 represents an embodiment of a technique of the current invention.

There may be several steps involved in this information topology discovery and instantiation process. Referring to FIG. 13, a step in an embodiment of the current technique can be to identify the Governable Information Objects (GIOs) necessary for a given policy assessment 1300. The GIOs are the information resources that may be the target of the policy assessment, e.g. the policy may be applied to the resources to access compliance. The GIOs can exist across different heterogeneous Resource Manager Systems; that is, portions of a particular instance of a GIO can exist within different resource managers having different models and, further, each particular model or resource manager has no dependence on or even knowledge of other resource managers that may control portions of the same GIO. That is, resources in RM 855 and RM 856 of FIG. 8 could collectively represent a single GIO in spite of their different models. In an embodiment, this step can be performed by searching each of the participating RMs, for example 855, 856, and 857, to identify and collect instances of state control points (SCPs) and GIOs managed in that RM that are a part of the GIO identified in the policy.

By identifying the local information objects that are the constituent parts of an identified GIO relating to the policy being accessed, it is possible to determine which Resource Managers should be included in the assessment. For example, if the resources of 860, 865, and 870, of resource manager 855 of FIG. 8 were not necessary for a given policy assessment, these resources would not need to be included in the Common Information Topology 890.

In some embodiments, a SCP is a special type of GIO that can represent an object in the RM's source information topology that has responsibility as a State Control Point. For example in a particular embodiment, a directory or folder that contains a sensitive file, and has explicit ACL permissions set on it, may be a SCP; the folder is both a SCP and a GIO and the information resources stored in the folder are also GIOs. Because SCPs can determine state for a collection of resources, these SCPs can map to information nodes in the information topology. In some implementations, the common information topology will, by design, not contain an explicit representation of every GIO held within the source resource managers. In these implementations, it would be necessary to determine the relationship between the GIOs targeted with a policy and the SCPs; the SCPs generally being the GIOs that are represented in the information topology. In some embodiments the GIO may have an identity relationship to an SCP; that is, the GIO is an SCP. In other embodiments, a GIO may be only a subset of the resources controlled by an SCP. For example, in the embodiment where a GIO is a document that does not have explicit permissions set on it; the SCP for this GIO would be determined by recursively traversing the folder or directory hierarchy to look for the first ancestor folder that does have explicit permissions set on it. In this embodiment, the ancestor folder would be the required SCP. Further, all the intervening folders may be represented in the information topology with this single SCP. Other SCP to GIO relationships are also possible.

The SCP nodes can be a subset of all the information objects held in the Resource manager. The SCP nodes can be represented in the normalized information topology instance, and these information nodes can create a sparse graph. This sparse graph of Information Nodes representing the SCPs can be the core structure of the information topology instance. The information topology instance may also contain additional nodes and relationships, such as specific GIOs, as appropriate. The sparse graph of the SCP nodes in the information topology instance is the essential representation of the actual state settings that are being enforced or otherwise implemented in the resource manager.

In some embodiments, once the GIOs targeted with the policies are decomposed into a set of GIOs and SCPs 1310 of FIG. 13, the state of these resources must be transformed into information nodes in the information topology. This can be accomplished by applying a transformation mapping for each of the RM source system instance(s) to the normalized topology instance, e.g. a transformation from the resource in the source system into the Information Nodes in the common information topology. The transformation of the information in the source model to the common information topology can include many aspects such as reduction of the information and translation of the information.

Source models can be very rich with information and, in some embodiments, not all information need be transferred from the source system to the normalized information topology. As well, even given that a particular resource be represented in the normalized information topology, every attribute of that resource need not be transferred. Further, only a subset of the represented resources may be necessary to enforce any given policy or set of policies. Therefore, the transformation may transfer only the information necessary to the common information topology and from this information only a sub-set of the information may be needed for any given assessment of the topology.

Referring again to FIG. 13, another aspect of an embodiment of the transformation may be a form of substitution or translation of information found in the source system instance into a form that can be represented using the capabilities of the normalized model 1320. For example, it could pertain to the objects or resources in the Resource Mangers as well as relationships within the source systems to be converted into a form that can be represented in the common information topology. Take a conversion of an "employee" resource from a source system to a common information topology. In the source system, employee may have attributes such as a title, work location, and department and a particular employee may have "title=principal engineer."

However, such an association might be meaningless in the common information topology where some or all of those objects, attributes, or relationships may be represented differently or may not be represented at all. As part of the transformation, some state expressed in terms of the source model may need to be transformed into a state expressed in terms of the information topology model. For example, the information topology model may include an attribute called "position" where an attribute value of "title=principal engineer" for a source system resource is transformed into the information topology with an equivalent attribute value of "position=engineer."

Further, the transformation from the sources to the common information topology can be synchronous or asynchronous. The transformation can happen at the resource manager, at the Normalized Topology, or as part of some intermediate process or entity placed therebetween. As well, the transformation from the source instance to normalized topology instance can be done as a single unit of work, to obtain a consistent representation of the source, or it can be done incrementally, to allow for the case that the source instance may be in flux, and those changes are reflected through communication of incremental changes from the source or RM to the normalized topology. Finally as shown in FIG. 13, the resources may be instantiated in the normalized information topology 1330.

In some embodiments, the transformation process described here determines the information nodes that are instantiated into the information topology. Note that while this embodiment describes a process that instantiates an information topology that may be dependent on the policies being assessed, conversely, the information topology can also be determined independently from the policies that are eventually applied.

Figure 14:
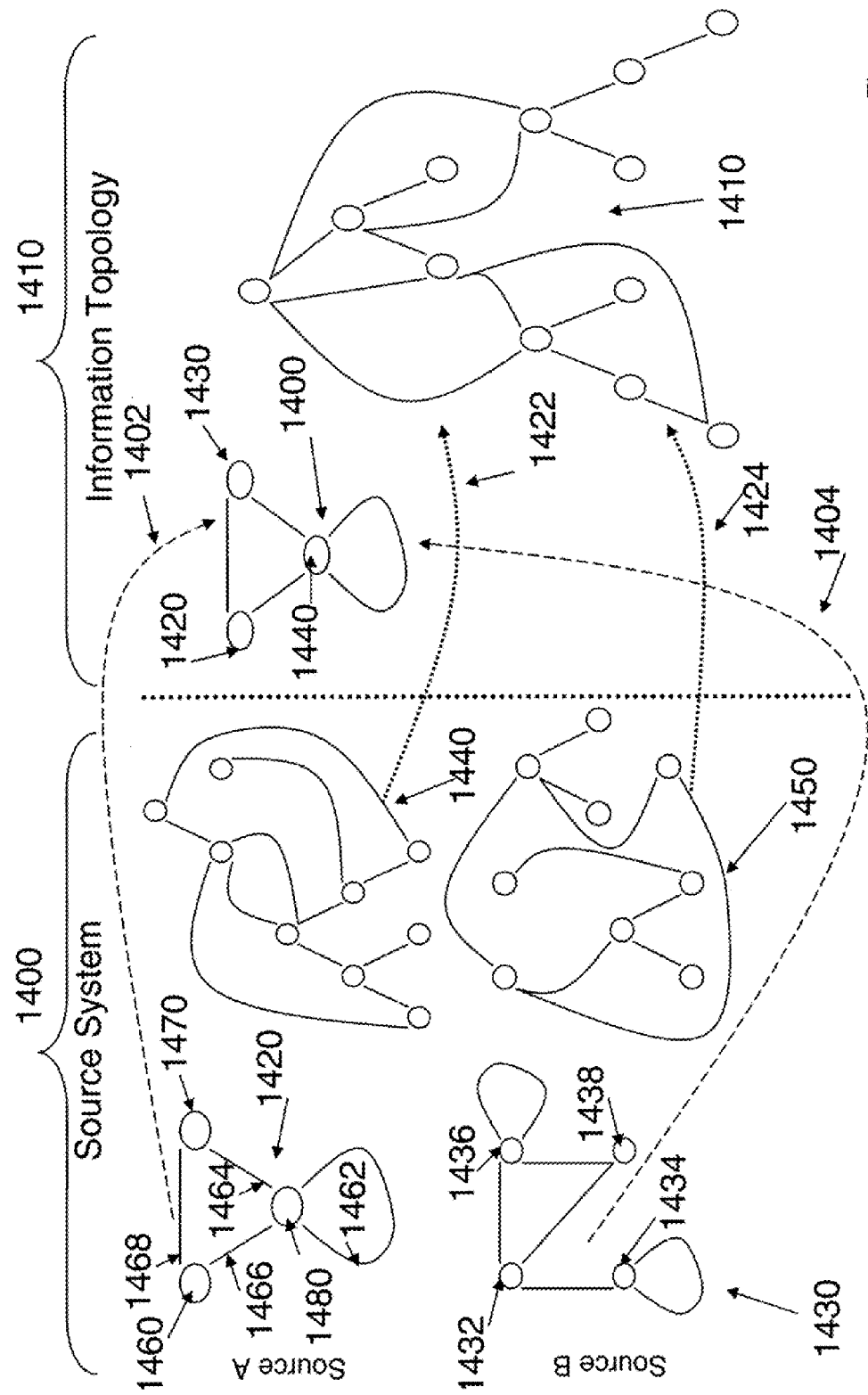
FIG. 14 represents an example of source to normalized transformations.

Two Previous Sections Summarized in FIG. 14

FIG. 14 depicts an embodiment of some of the main aspects of what has been described in the last two sections. The left hand side of the FIG. 1400 refers to elements in the source systems and the right hand side 1410 refers to elements in the information topology. Note that the left hand side illustrates that there are a plurality of source systems. As has already been pointed out, there is a single information topology, as shown on the right-hand side of the figure.

Referring now to the Source Systems 1400, depicted in the figure are two distinct source system models, 1420 & 1430. In this example, the source system models define classes 1460, 1470, 1480, 1432, 1434, 1436, and 1438 that represent items such as documents, folders, users, groups, and applications. The source system models also define relationships between classes 1462, 1464, 1466, and 1468 such as "contained in", "has access to", "provides authorizations services for" and so on. Note that relationships may be defined between a class and itself.

Referring now to the Information Topology 1410, the information topology has a single model 1400. That model defines classes 1420, 1430, and 1440 that represent items such as documents, folders, users, groups, and applications. The information topology model also defines relationships between classes such as "contained in", "has access to", and "provides authorizations services for." Note that relationships may be defined between a class and itself.

As previously discussed, the models for the source systems may be distinct from the information topology model. In an embodiment, to support the creation of an information topology that represents the tangible items in the source systems, transformation rules must be defined that will allow GIOs in the source systems to be mapped to Information Nodes in the information topology. In FIG. 14, these transformation rules are depicted with lines 1402 and 1404.

The entities in FIG. 14 that have been described to this point, the source models, the information topology model and the transformation rules, are all defined or identified during the deployment of the solution described in this disclosure. That is, these describe what may be design time activities.

Once the system has been configured and is performing assessments, the source systems may contain GIOs, which are instances of the classes 1460, 1470, 1480, 1432, 1434, 1436, and 1438 in the source system model and which may be related via the relationship types 1462, 1464, 1466, and 1468 also defined in that model. In this example, the collection of GIOs and relationships is depicted with the graphs 1440 and 1450. As previously described, certain GIOs may be represented with information nodes in the information topology and in order to do so, source system-to-information topology model transformations may be applied (e.g. 1402 and 1404) to those GIOs resulting in nodes in the information topology 1410. An example of the transformation function is depicted in FIG. 14 with the lines labeled 1422 and 1424.

Build the Policy Graph

In this example, as described in connection with FIG. 11, above, the policy to be assessed must be represented in a suitable form. The original policy may begin as a natural language statement of requirements 1100. This policy may then be equivalently stated using predicate logic expressions 1110. This predicate logic representation may provide the most compact form for stating the policy, however this form may not be suitable for direct application to the normalized information topology instance. In another step of an embodiment of this technique, the set of policies to be assessed may need to be decomposed, re-factored, or otherwise reformulated in order to facilitate the application of these policies to the normalized information topology instance.

Figure 15:
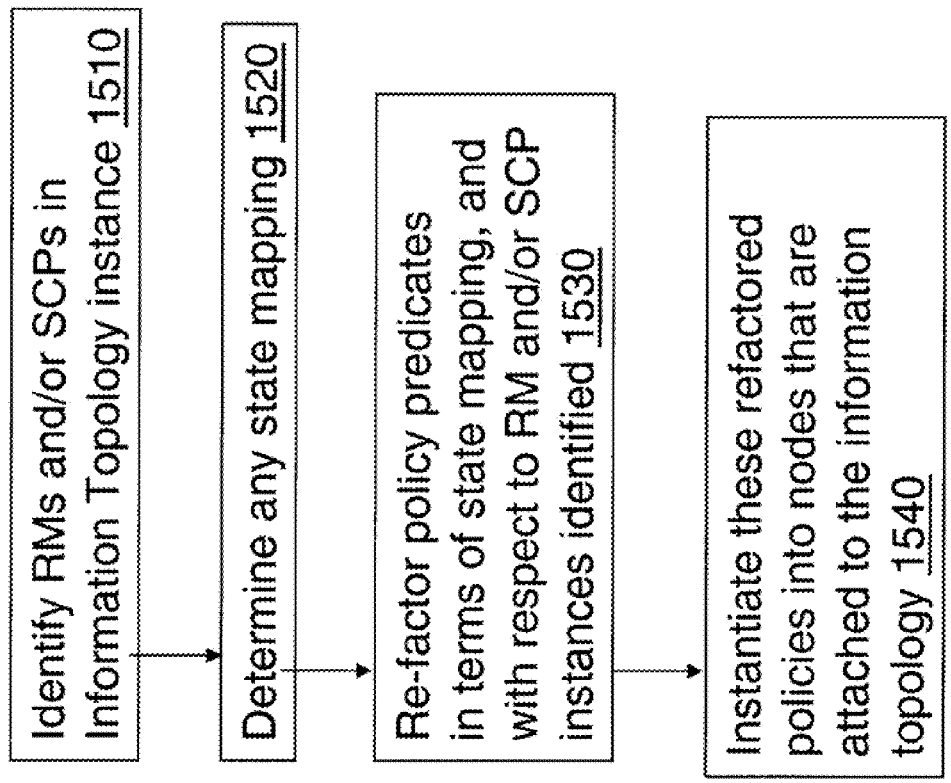
FIG. 15 represents an embodiment of a technique of the current invention.

Referring now to FIG. 15, this figure shows a representative example of steps that can be followed when performing the reformulation of the policies. Specifically, for each term found in the originally stated policy predicates, the policy can be restated as an equivalent predicate or predicates, which has been factored (or decomposed) into different subsets, each of which corresponds to a particular node available in the normalized information topology. In particular, this factoring can be performed based on the number of participating RM or, in the preferred embodiment, the policy predicate can be factored based upon the SCPs, which may represented by information nodes available in the normalized information topology instance 1510. A state mapping can be determined 1520 and the policy predicates can be refactored in terms of the state mapping 1530. As well, the refactored policies can be instantiated into nodes attached to the information topology 1540.

For an example of an implementation of this step of an embodiment, refer to FIG. 16; this figure depicts a derivation of refactored policies for a specific type of policy—Separation of Duties (SOD) and a further explanation of the Separation of Duties policy will be described herein, The left hand side of FIG. 16 illustrates sets A, B, C and D in a Separation of Duties exclusion list.

In this example, the set A represents a collection of sensitive documents or functions that is a GIO. The set B represents another, disjoint set of sensitive documents or functions that is a GIO. For purposes of policy compliance in this example, set A and Set B are to be considered mutually exclusive. Similarly sets C and D are also considered to be mutually exclusive. Further, Set A can be restated as a collection of elements, $a_1$, $a_2$, $a_3$. Similarly, set B can be represented as its constituent elements, $b_1$, $b_2$, $b_3$. Similarly, the representation may also be performed for sets C and D. These enumerations of the elements of the sets can list each of the instances of the GIOs of interest, without regard to upon which particular Resource Managers they exist.

In this example, the individual elements of these sets can be regrouped to designate a new set $A_1$, which represents all of the $a_i$ that are present within each given Resource Manager, or SCP. Thus, the list of elements $\{a_1, a_2, a_3 \ldots\}$ can be regrouped on a per-Resource Manager, or per-SCP basis, yielding sets $A_1$, $A_2$, $A_3$, which can represent all of the $a_i$, (or $b_i$, $c_i$, $d_i$), that are found on each such Resource Manager, or within each SCP. Similarly this may be performed for B, C, and D. In this way, the union of the $A_i$ is an equivalent representation of the originally stated set A, but is now grouped in a manner that can parallel the construction of the information topology instance. This decomposition of the sets into these subsets that correspond to the SCP is an example of the decomposition of the GIOs into the related GIOs that was described in the preceding section.

Referring now to the right hand side of FIG. 16, the required SOD policy is stated in terms of the users (and groups) that have access to the sensitive and mutually excluded documents and functions. The notation adopted in this figure is that the prime indicates the use of an actual state mapping function, from the source system into the normalized topology, such that A' represents all of the users (and groups) that due to some actual state information on the source system Resource Managers or SCPs (such as an access control list setting), will have access to the local documents that are members of the complete set A. Thus, for purposes of assessment, the original exclusion set $\{A, B\}$ can be equivalently restated as $(A' \cap B' = \emptyset)$, and similarly restated for C and D. This mapping enables the assessment of the originally stated policy in terms of an effectively equivalent and measurable actual state. The logical conjunction of $(A' \cap B' = \emptyset)\hat{\ }(C' \cap D' = \emptyset)$ states that the intersection of the sets of users (and groups) who have access to documents in document set A, and the users (and groups) who have access to the documents in document set B, shall be the empty set (without regard to where these documents are found), AND . . . similarly for users and groups who have access to the documents in document sets C and D . . . .

Finally, the sets may be regrouped by applying the techniques of set algebra, to arrive at a representation where each individual policy term corresponds to an SCP node in the normalized information topology instance. For example, in the lower right hand side of FIG. 16, the term $(A'_i \cap B'_j = \emptyset)$ represents that the set of all users (and groups) that have access to a document that is a member of the set $A_i$ via a given $SCP_i$, and the set of all users (and groups) who have access to a document that is a member of set $B_j$, via a given $SCP_j$. The intersection of these sets is tested to verify that it is the null set. In the reformulation of the policy all combinations of $A_i$ and $B_j$ can be tested, and a representation can be arrived at which enables a correspondence between each policy predicate, and that predicate's target information node, in the actual information topology instance.

Further, referring back now to FIG. 15, in step 1540, the re-factored policy predicates can be instantiated as objects into the normalized topology instance. Referring to FIG. 17, each policy object can be a node in the combined information and policy topology that maintains a relationship link to an adjacent information topology node that represents the target of the policy. The set of policy nodes in the normalized topology instance can be referred to as the "Policy Topology" and the set of Information Nodes in the topology instance as the "Information Topology" and collectively can be referred to as the "Information and Policy Topology".

In some embodiments, as part of the overall topology, the policy nodes can perform a comparison therebetween of the actual state, and/or required state, and/or capabilities (state) data contained within itself and/or within the adjacent information topology nodes, via the association relationships they maintain with those information nodes. This comparison operation can evaluate whether the state of the information node complies with the policy rules embodied in that policy node. The result from any policy node may be further propagated through the policy graph as needed, resulting in additional policy determinations.

Figure 18:
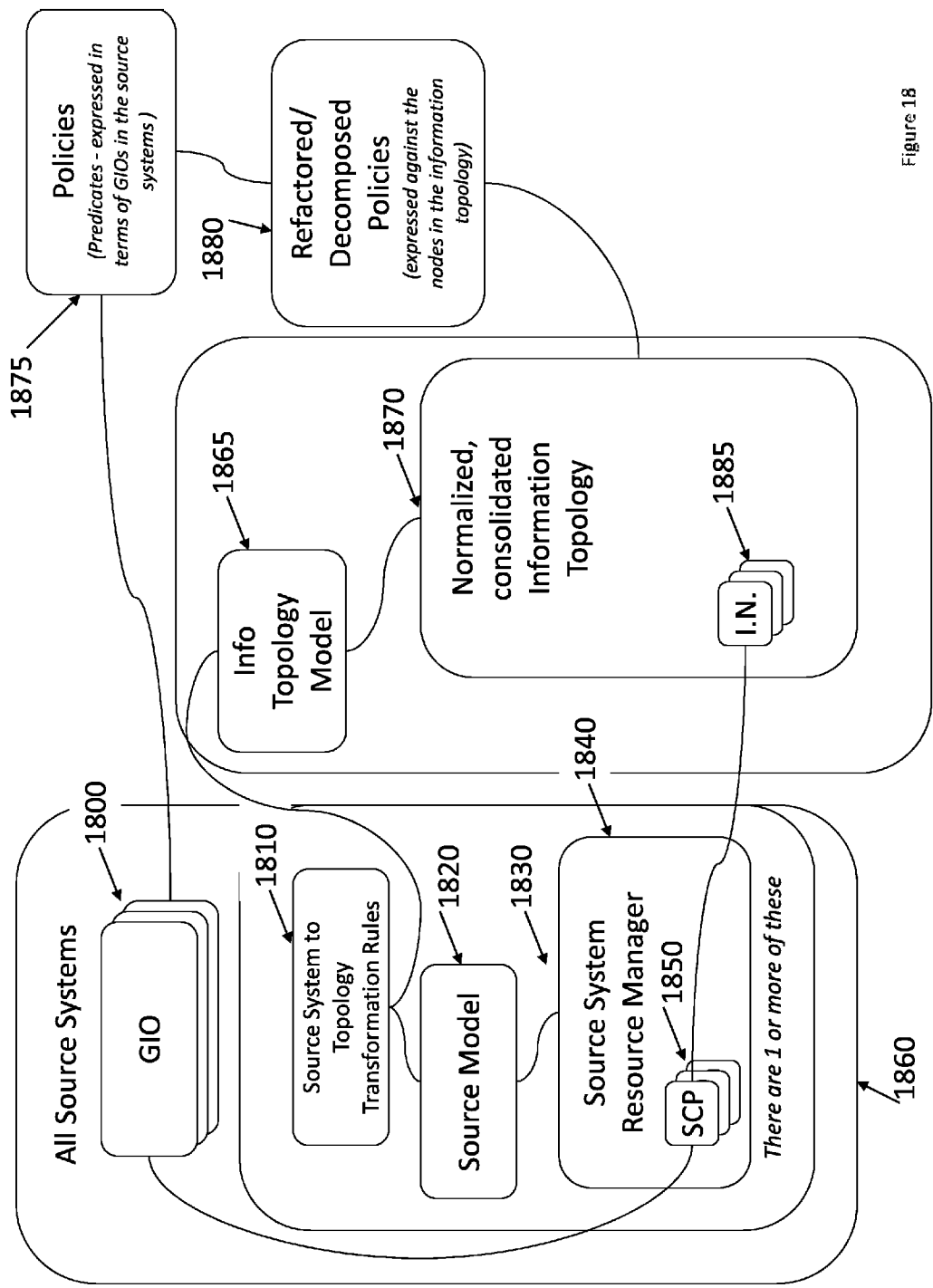
FIG. 18 illustrates a combination of FIGS. 5 and 9.

Refer now to FIG. 18, which represents a summarization of some of the teachings of the present disclosure. FIG. 18 illustrates a combination of FIGS. 5 and 9 and aforementioned relationships between a source model and a common information topology. FIG. 18 shows at an aggregate level how source systems 1860 can relate and may be mapped into a common information topology 1870 and how originally stated policies 1875 and refactored policies 1880 may be related to the source systems 1860 and the information topology 1870. In particular, note that, in this figure, policies 1875 are expressed in terms of the GIOs 1800 existing in and across source systems 1860. Further, GIOs 1800 can be refactored into subsets that correspond to the SCPs 1850 in the source systems 1840. The SCPs 1850 can then be mapped to Information Nodes 1885 in the Information Topology 1870 using the Source Model to Information Topology Model mappings 1810, which can bring state information from the source system to the information topology 1870. This state information can be utilized in evaluating re-factored policies 1880. This figure shows how the policies 1875 which can be related to GIOs 1800 also may be relatable to another formulation of the same policies, and in turn, such re-factored policies 1880 can be relatable to the information topology 1870. In particular, the example of the re-factored policy graph shown is suited to an instantiation in which the policy terms are relatable to Information Nodes 1885 that correspond to the target information nodes.

Also, note that the results obtained upon evaluation of the re-factored policies that are associated with the information nodes instantiated in the information topology can be known to be traceably representative of the results that would have been attained upon evaluation of the originally stated policies when applied to the local GIO existing in the actual information systems environment, if such an evaluation were to be done. However, the aforementioned method provides a faster, less expensive way from a decision to access compliance to when such a result is available.

Do the Assessments

Another step in an embodiment of the current technique can be to perform the desired policy assessment(s) on the normalized information topology. The information topology may be constructed in such a way that the actual states of the resources of interest are represented. Referring to FIG. 19, the information topology can support a number of different analyses. Determining whether a policy is being adhered to 1910, may be thought of as checking the actual state of the information topology against the requirements expressed in such policy. It is also possible, in cases where the information topology shows an out of compliance situation, that the information topology may be analyzed to determine what the root cause of the policy violation is 1920. Changes to the source systems can be simulated 1930 by making modifications to the information topology and determining the impact that such changes would have 1940. In this instance, the information topology represents potential state rather than actual state. The connection from the information topology to the real world systems which can be enabled via various instrumentation techniques can in various embodiments ensure consistency of the results between the actual information systems and the established information topology.

In one embodiment the normalized information topology and the re-factored policy predicates described above can be deployed into (instantiated in, or realized in) the Smarts® Domain Manager using MODEL™ and using all the related capabilities of the Smarts® environment, it is possible for the Smarts® correlation engine to then perform the policy assessment and determine whether the information topology is in compliance with the stated policy or policies.

Specifically, the information nodes and policy predicates can be MODEL™ classes that implement appropriate models of state in the normalized information topology and can utilize the capabilities of MODEL™, and associated technologies, including but not limited to the use of instrumented attributes and or propagated attributes and or events and or symptoms and or problems. The Smarts® Domain Manager, for example, can perform a correlation of observed information node states and their associated probabilities to detect policy violations and or to establish or determine the existence of a policy compliance violation as well as a most probable root cause for the violation. In the case that the normalized information topology is not in compliance with the stated policies, the use of the Smarts® technology enables the Root Cause Analysis functions. In addition, one can also leverage the Impact Analysis functions of Smarts® to assess the affects of any changes that are to be made to the normalized information topology.

Because of the mappings that exist between the source model(s) and instance(s), and the normalized information topology model and instance, the results of the Smarts® driven policy assessment that can be performed, and the RCA, if any, and the IA, if any, will all be directly indicative of the actual policy compliance situation that exists on the participating RM. Any policy compliance problems identified can be associated with a most probable root cause, and the nodes in the normalized information topology that are implicated in the root cause analysis will correlate to GIOs or SCPs, which represent information resources that can be identified in the source information model of the particular RM. Remediation can then be performed at the source system, using existing methods.

Keeping the Information Topology Current

Figure 20:
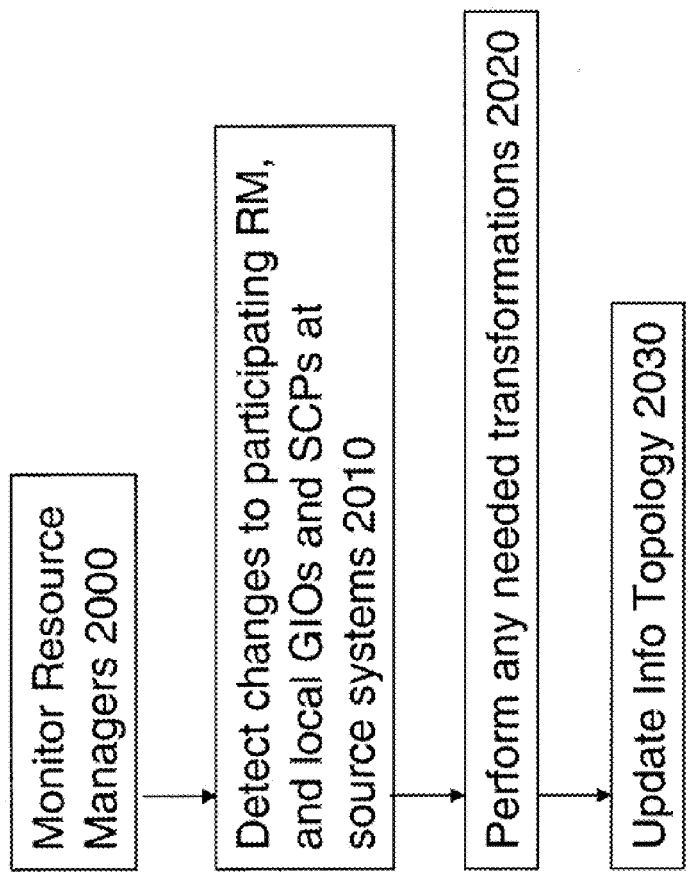
FIG. 20 illustrates a method of a technique of the current invention.

In a particular embodiment, once an information topology instance that is sufficiently accurate to enable the assessment of the stated polices has been established, a determination of compliance or non-compliance can be made for any given point in time. In addition, as shown in FIG. 20, the information topology instance can be kept current, and up to date through the on-going monitoring of the participating RMs. In one possible embodiment, this monitoring may be performed by leveraging the techniques of Change Data Capture (CDC) and Change Data Propagation (CDP), collectively referred to herein as CDC. By applying the techniques of CDC it can be ensured that the information topology instance can be kept current over the course of time, and at any given moment can serve as an appropriate representation of the source systems, even as the state of the source systems may be constantly changing.

For example, as changes are made to any of the RM, including but not limited to changes such as which RM are participating, changes such as adding, updating, and or deleting resources, and or changes to the relationships between those resources and the SCP on the participating RM systems, the normalized information topology model can be dynamically amended accordingly.

One example of a change at the RM that might result in a need for a change in the information topology instance could be a local administrator adding a new and unique Access Control List (ACL) on an intermediate folder, somewhere within a file system hierarchy in a source system. As the intermediate folder previously lacked any specific Access Control List settings, that folder may not have been represented in the common information topology, and the related GIOs states could have been represented by the SCP that corresponds to the nearest ancestor folder that did have an Access Control List specified. With the introduction of the new and perhaps unique ACL on the intermediate folder, the information topology can be amended so that the affects of that change on the overall policy assessment may be evaluated.

Similarly, if the stated policies need to be amended, this can be accommodated by stating the new canonical policies, and then repeating the steps described herein to factor these policies for the then-current normalized information topology instance. This refactoring may be fully automated and performed as soon as a policy change is made.

Timely propagation of changes performed at the RM allows for a more accurate representation of the state of the real information systems that may be the target of the policy assessment. In one embodiment, this may be performed, through the use of Change Data Capture techniques at the RM policy administration point(s), and appropriate instrumentation of the normalized information topology model. The changes detected at the individual participating RMs can be reflected into the normalized information topology model, in as timely a manner as may be necessary for the particular policies being assessed.

The preferred embodiment is to leverage incremental changes as they occur at the RM. As policy or information changes are made by the local administrator (or users) to the information objects (GIOs or SCPs) being managed by any particular RM, these may be intercepted and propagated to the normalized information topology using any available communication channel. A preferred embodiment is to leverage a reliable, guaranteed delivery, store-and-forward messaging system with a quantifiable quality of service. In another embodiment, this change capture process may also be performed in a batch mode, by periodically refreshing all of the information from each of the RM. In another embodiment, the CDC communication may be performed via either a push of the changed data from the source system(s) or via a pull of the changed data from the information topology, or some combination thereof.

When applying these incremental updates to the normalized information topology it may be necessary to calculate the transitive closure on the portion of the topology model that is affected. For example, if a group membership change event occurs, it may be necessary to calculate what specific GIOs and SCPs are impacted by this change, and then adjust that portion of the topology. For any given RM, this computation of transitive closure can leverage the same source system-to normalized-topology-model mapping definition used to create the initial representation of the normalized topology.

For example, in an embodiment, the information topology can be created through asynchronous distributed processing and each RM can be polled or can independently perform all necessary processing to accomplish any necessary transformation. In this case, each RM could provide its portion of the information topology. In this or another embodiment, no Resource Manager has nor needs to have awareness of any of the other resource managers. Further, this embodiment provides the benefits that no Resource Manager relies on any other Resource Manager, eliminating the possibility that a single Resource Manager becomes a bottleneck or single point of failure for the overall assessment.

Choose Topology First or Policies First

Figure 21:
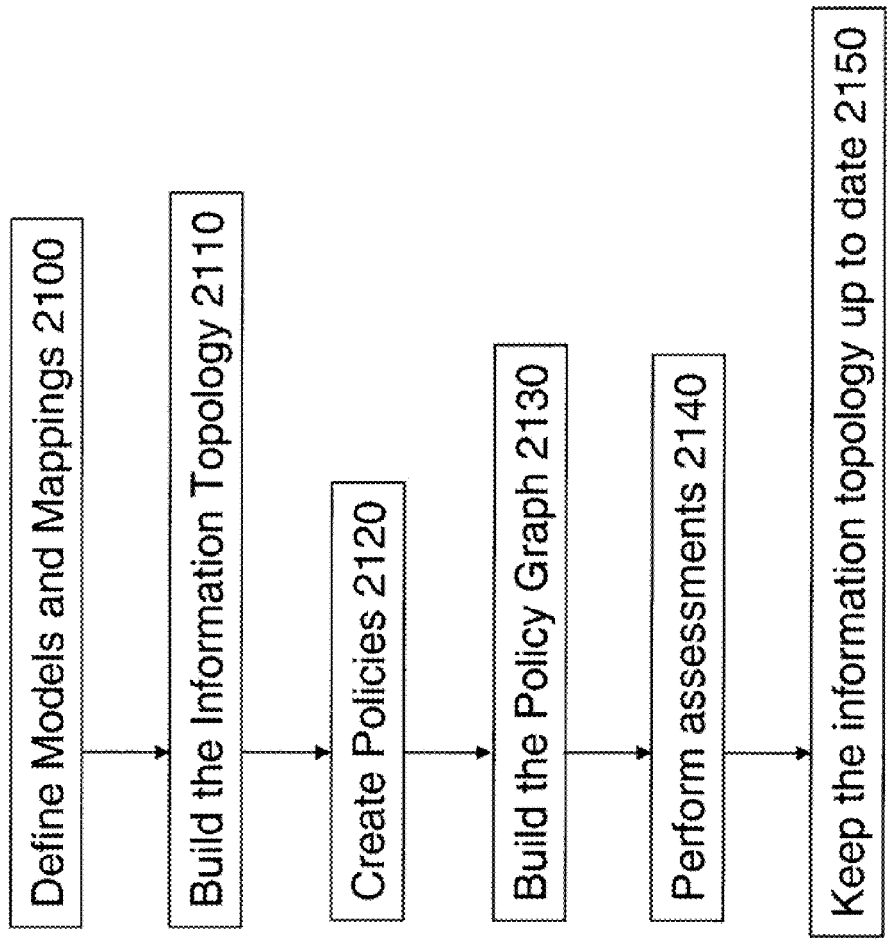
FIG. 21 is a method of a technique of the current invention.

Now referring to FIG. 21, another technique of an embodiment is disclosed. In contrast to the previous techniques described, in this technique, the resource managers of a set of source systems are searched to identify GIOs and SCPs needed for a policy assessment, before the specific policies to be assessed have been identified or defined. One or more mappings may be created to transform the identified GIOs and SCPs into the common information topology. The GIOs may be mapped and the SCPs may be mapped or calculated 2100 then mapped into an instance of the information topology 2110. The specific policies to be assessed may then subsequently be specified 2120, 2130, at any time after the information topology has been instantiated.

As before, compliance with a set of states, or in a particular case a set of policies, may be determined 2140, and if the common information topology is not in compliance, a root cause analysis can be used to determined which of the source systems may be the cause of the non-compliance. Considering these two particular cases, the one in which the policies are defined prior to the information topology instance, and another, in which the information topology may be defined prior to the policies to be assessed, each may have relative advantages, and either embodiment may be preferred depending upon the requirements and or constraints encountered by the implementer in any given situation. As well, the information in the information topology may be updated 2150.

Example Embodiment Separation of Duties

A particular embodiment of the aforementioned technique will now be described with respect to ensuring compliance with a "Separation of Duties" (SoD) policy. For example, to comply with regulations, a Wall Street bank or broker must keep their investment banking functions such as M&A advisory separated from their trading functions such as equities trading and derivatives trading. Implementing separation of duty controls in a heterogeneous environment can be difficult, since different business units or departments are likely to deploy different IT systems, which in turn implement different access control schemes, and all are usually managed separately. The policy assessment chosen, in this embodiment, is whether or not there are any users who have been granted access to these mutually excluded information resources.

As shown in FIG. 7, the steps for an embodiment of this technique include representing an information topology, wherein the information topology comprises a plurality of resources and a plurality of states, representing a set of polices, wherein each policy expresses one or more requirements applied to the plurality of resources, and assessing compliance of the information topology by determining whether the states meet the requirements expressed in the policies.

As well, implementation of an embodiment of this technique requires creating a representation of a common information topology and populating that topology with information from numerous source systems. Policies that can be applied to the common information topology can also be derived via the processes previously described. Once described against the common information topology, the common information topology can then be tested for compliance with policies.

In the example, merger and acquisition information is referred to as set "A", and this information is being held somewhere on a Documentum® e-Room® system. In addition, some mutually excluded information that may be needed for the two types of trading operations, namely equities trading, and derivatives trading, are referred to as set "B" and set "C", respectively. These additional two sets of information resources are being managed on another system, which can be protected by an identity and access management system such as RSA Access Manager. The SOD policy to be enforced may be stated as "A excludes B" and "A excludes C". Finally, note that the user and group identities for the hypothetical bank are being managed in a corporate LDAP server. Thus, in this example there are two resource manager source systems that will be represented in the normalized information topology, as well as a single common LDAP server for user group information.

Figure 22:
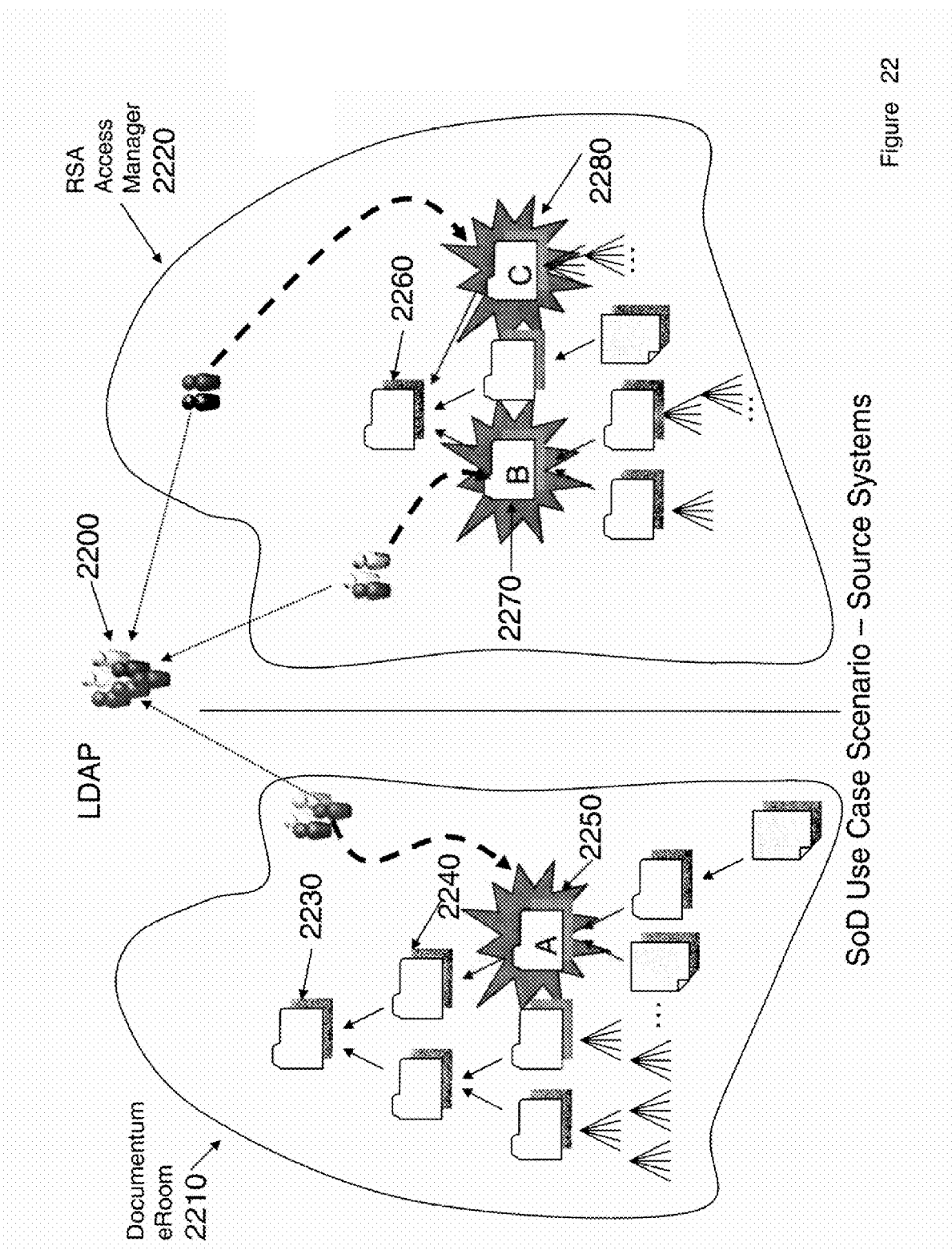
FIG. 22 is an illustration of the objects in a Separation of Duties (SoD) problem.
Figure 23:
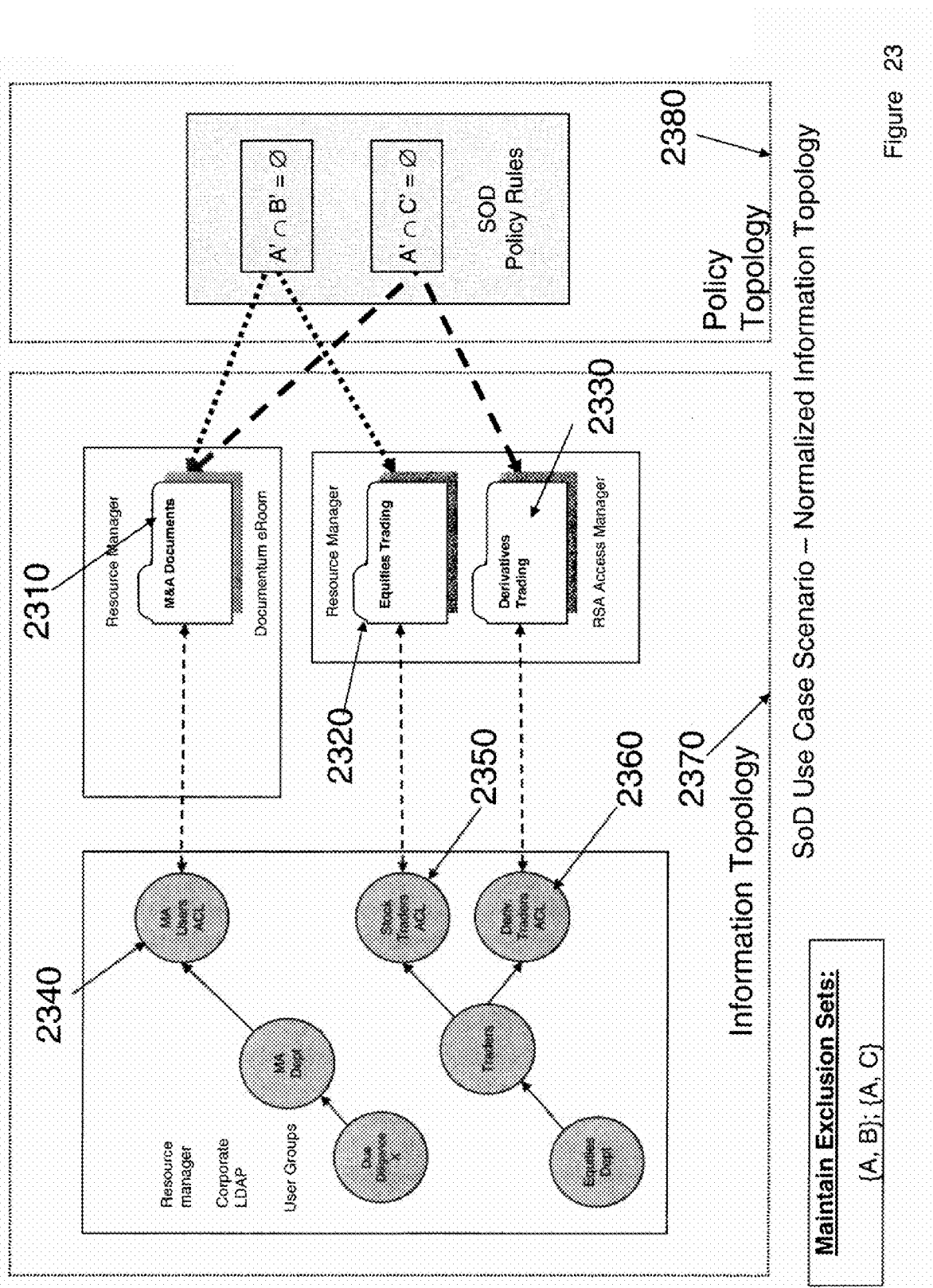
FIG. 23 represents the normalized information topology for the example SoD problem

Referring now to FIG. 22, this figure illustrates a representation of the resources being managed on each of three source systems, each of which manages some of the information types in the SoD problem. In addition, FIG. 23 shows the normalized information topology that is derived from the resources in FIG. 22 by following the methods of the present disclosure. Specifically, in FIG. 22, the LDAP directory 2200 is used to maintain all the user and group identities within the scope of the SOD policy assessment. This is typical practice for many enterprises. The M&A documents which can be called set "A" are found to be held within a specific folder 2250 on the Documentum e-Room system 2210. The folder 2250 is identified as a GIO because it contains relevant governable information objects. In addition, because it is a folder that has explicit access control settings established, it is also an SCP. Folder 2250 in FIG. 22 is therefore represented as an Information Node 2310 within the normalized model shown in FIG. 23. Note that folders 2230 and 2240 are present as part of the actual folder hierarchy in the e-Room but are not represented in the information topology shown in FIG. 23. This is because 2230 and 2240 do not directly contain any governable information objects relevant to Separation of Duties or do not maintain any explicit access control settings; therefore they do not qualify as SCP and are not represented as information nodes in the information topology.

Continuing now with FIG. 22, the equities trading and derivative trading information is managed by RSA Access Manager 2220. These Equities Trading resources referred to as set B are found to be held in a specific folder 2270, while the Derivatives Trading resources referred to as set C are held in folder 2280. These two source system folders are considered GIOs because they maintain the relevant governable information objects, and in addition are considered SCP by virtue of the fact that they each also maintain explicit access control list settings. These access control list settings represent specific state information that is of interest with respect to assessing SOD policy compliance. Thus, source resource 2270 is also represented in the normalized information topology of FIG. 23 as Information Node 2320. Similarly, source resource 2280 in FIG. 22 is represented in the common information topology of FIG. 23 as information node 2330. Note that the resource represented as folder 2260 does not directly contain any governable information objects relevant to Separation of Duties nor does it maintain any explicit access control settings; therefore it does not qualify as an SCP that needs to be represented as information nodes in the information topology.

The SOD policy assessment to be preformed consists of a comparison of the actual state of the GIO 2250 to the actual state of the GIOs 2270 and 2280. The actual state information of interest is the set of users who have been granted access to the respective resources represented by these information nodes. The actual state information of GIOs 2250, 2270, 2280 is represented in the information topology via Information Nodes 2310, 2320. 2330, respectively.

FIG. 22 also shows how the access control information for the specific folders of interest in each of the source systems 2210 and 2220 has delegated to the LDAP server 2200. This authorization is commonly accomplished by associating the folders in the resource manager with a user group in the LDAP server. Users who belong to the associated group, or to any sub-group, would be granted access by the resource manager. Thus, in FIG. 23, user groups in LDAP are represented that are directly associated with each of the instantiated information nodes in the normalized information topology. As shown, LDAP group 2340 is authorized to access information node 2310. Similarly for LDAP group 2350 and information node 2320. Finally, LDAP group 2360 is authorized for Information Node 2330. Each of the groups 2340, 2350, 2360 also have subgroups within LDAP, and these have also been represented in the normalized information topology instance (these sub groups not labeled).

Having established the needed information nodes in the normalized information topology, the policy predicate refactoring may now be performed. In FIG. 22 the required SOD policy can be expressed as set "A" resource 2250 excludes set "B" resource 2270, and set "A" resource 2250 excludes set "C" resource 2280. In order to attach policy predicates to the information nodes in FIG. 23 the policy may be expressed in terms of the state control points that have been incorporated into the normalized topology. In this specific example, the mapping is simple, and information node 2310 may be referred to as the set A, and the set of users who have access to 2310 are then referred to as A'. Similarly information node 2320 may be referred to as set B, and the users who have access to 2320 are referred to as B'. Finally, information node 2330 can be referred to as set C, and users who have access to same are referred to as C'. Thus, the required exclusion sets become A'∩B'=Ø and A'∩C'=Ø. FIG. 23 shows how these predicates have been introduced and attached to the information topology 2370 as policy topology 2380. Once instantiated, these policy predicates may be evaluated based on the comparison of actual state data that available through the related information nodes.

In this illustrative example, the GIOs map directly to the SCPs and do not span the RMs or the SCPs. This may be different in other examples. For example, when the relationship from GIOs to SCPs is not a direct one-to-one mapping, then the policy refactorization may be significantly more complex.

Figure 24:
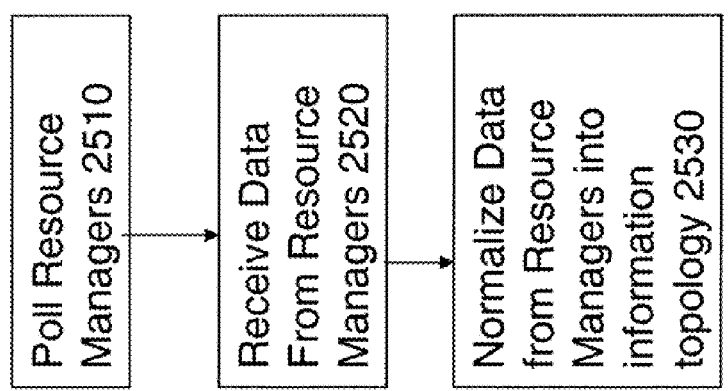
FIG. 24 is an embodiment of a method useful in the current invention.

The method of the present disclosure can of course be applied to any number of pairs of mutually excluded resources, managed by any number of resource managers. As an illustration of this, now consider the case of Separation of Duties across three sets of mutually excluded documents, managed across three resource managers. In order to keep this example simple, assume that each resource manager will have just one SCP per exclusion set member. As well, the data from the resource managers may be transferred from the resource managers as illustrated in FIG. 24. This may occur by polling the resource managers 2510, receiving the data from the resource managers 2520, and then normalizing the data from the resource managers into the information topology 2530. The embodiment of FIG. 24 may also be useful in keeping the information in the information topology updated.

Figure 25:
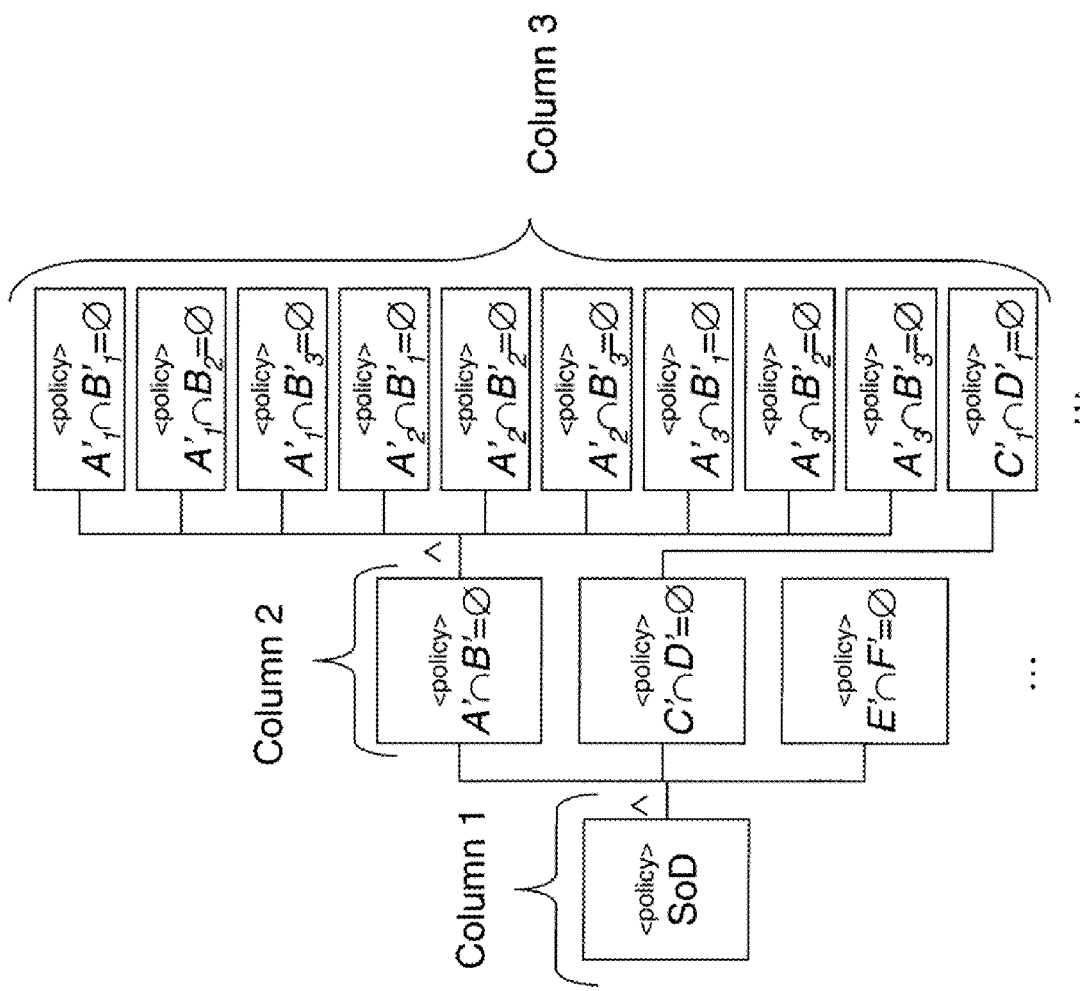
FIG. 25 is an example of an expansion of the separation of duties problem with respect to the sets within the problem
Figure 26:
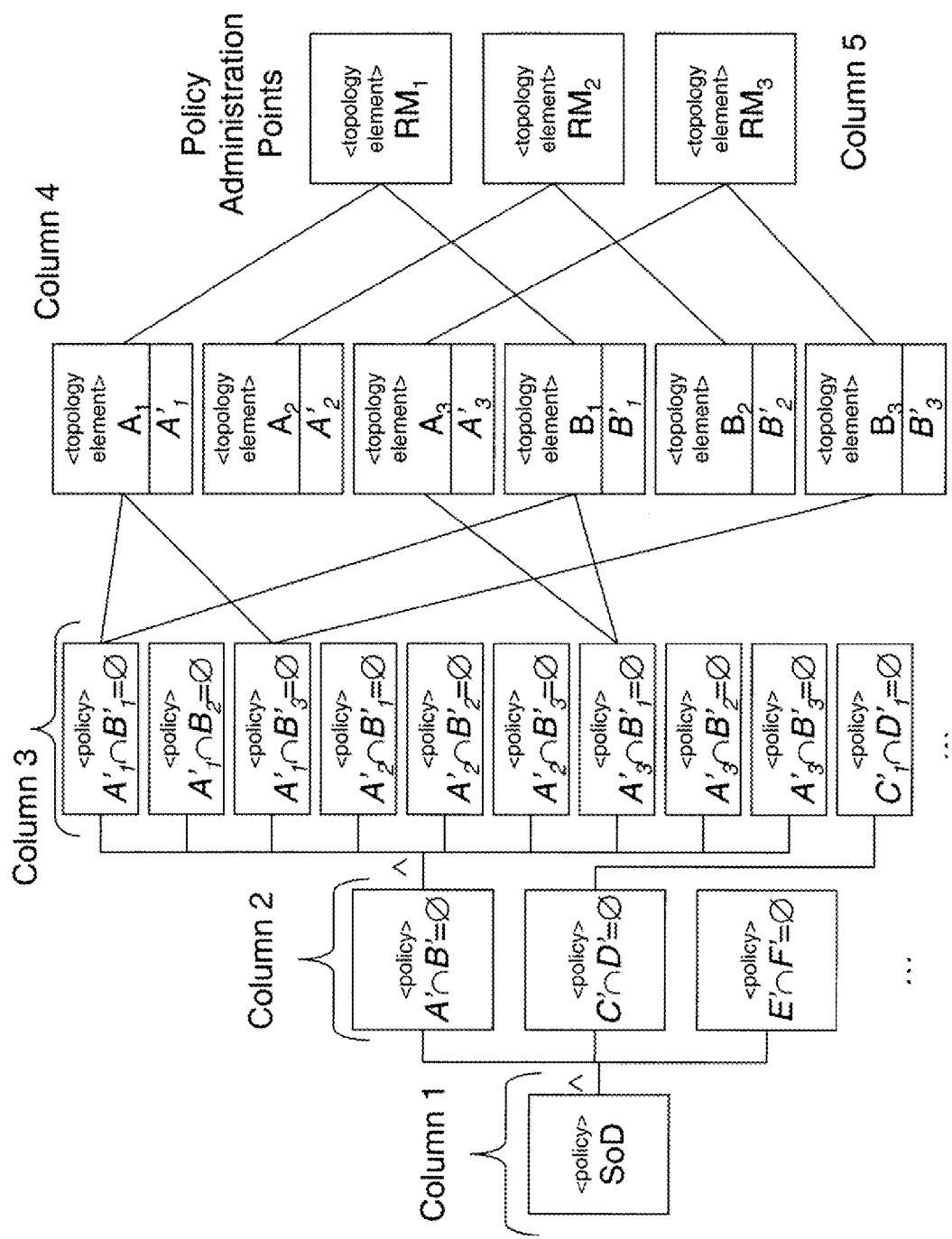
FIG. 26 is an expansion of the Figure in 25 where each of the members of the sets are mapped back to the resource managers

FIG. 25 represents a graphical view of the canonical policy expressions that can describe the decomposition of the separation of duties policy as described above. The first column represents an embodiment of an overall policy to be implemented and the second column represents the constituent parts of that policy in canonical terms. The third column represents the expansion of these constituent parts of the policies with respect to the sets of elements that could be found within the information topology. FIG. 26 represents the same policy topology and includes between column 3 and column 4 the actual mapping of specific constituent policy predicates to the specific nodes (in column 4) within the normalized information topology to which they apply. Column 5 shows how those normalized topology elements map back to their respective resource managers.

Figure 27:
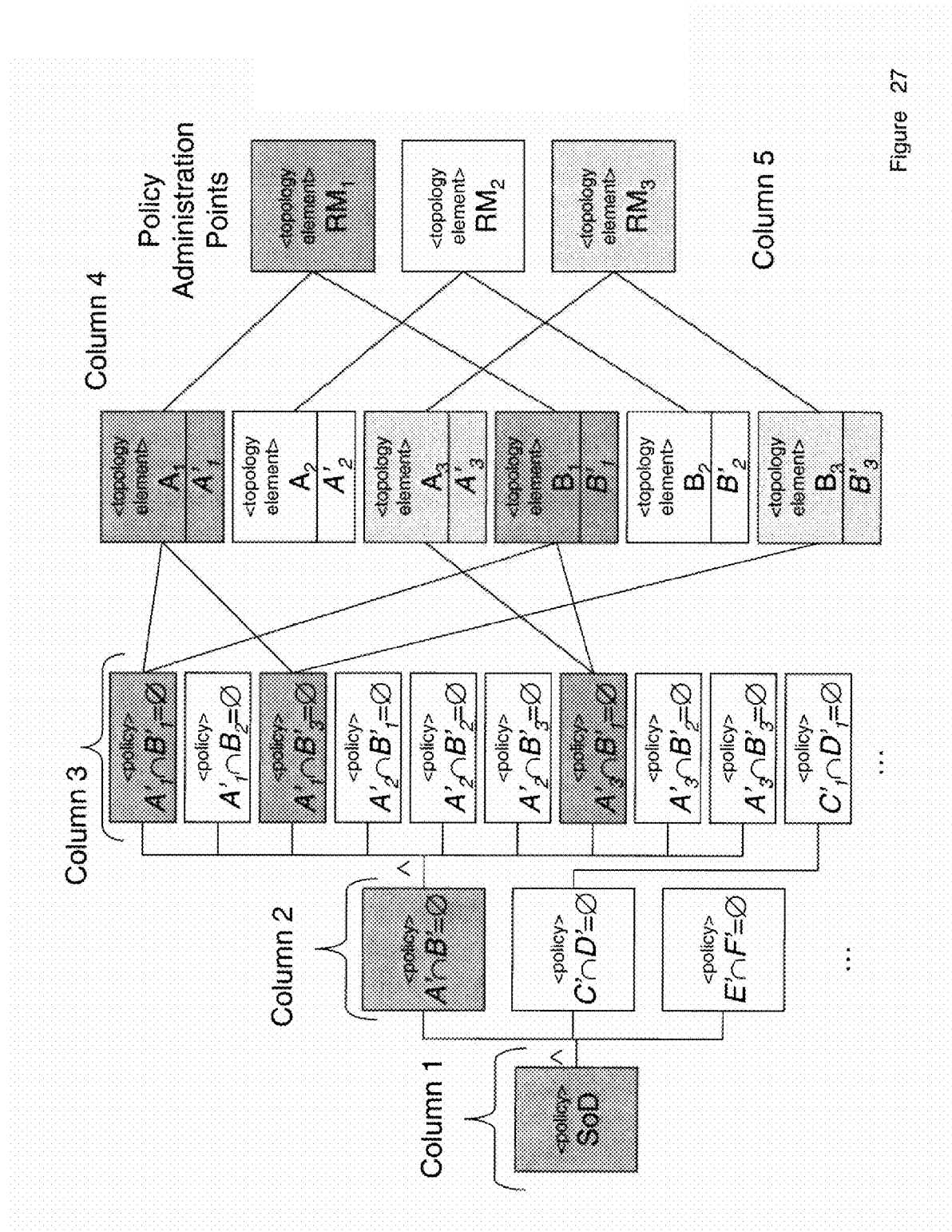
FIG. 27 is a further expansion of the Figure in 26 where each of the members of the sets are mapped back to the resource managers to which they belong illustrating the resource manager that is the cause of non-compliance with a policy.

Referring to FIG. 27, this figure shows how this mapping may be used to determine which Resource Manager is violating the SoD policy. When one or more specific constituent predicates that contribute to that overall SOD policy has been violated the overall SOD policy is also violated. In FIG. 27, the first row of column 3 is highlighted to indicate that this constituent predicate has been violated. Similarly, the third predicate in column 3 is highlighted to indicate that it has been violated. Finally, the seventh predicate in column 3 is also highlighted to indicate the occurrence of a mutual exclusion violation for the indicated document sets and resource managers. The root cause analysis feature of this invention determines that based on the enunciated policy, RM1 is the most likely root cause of this non-compliance, as indicated by the darkest shading of the box labeled $RM_1$ in column 5.

Figure 29:
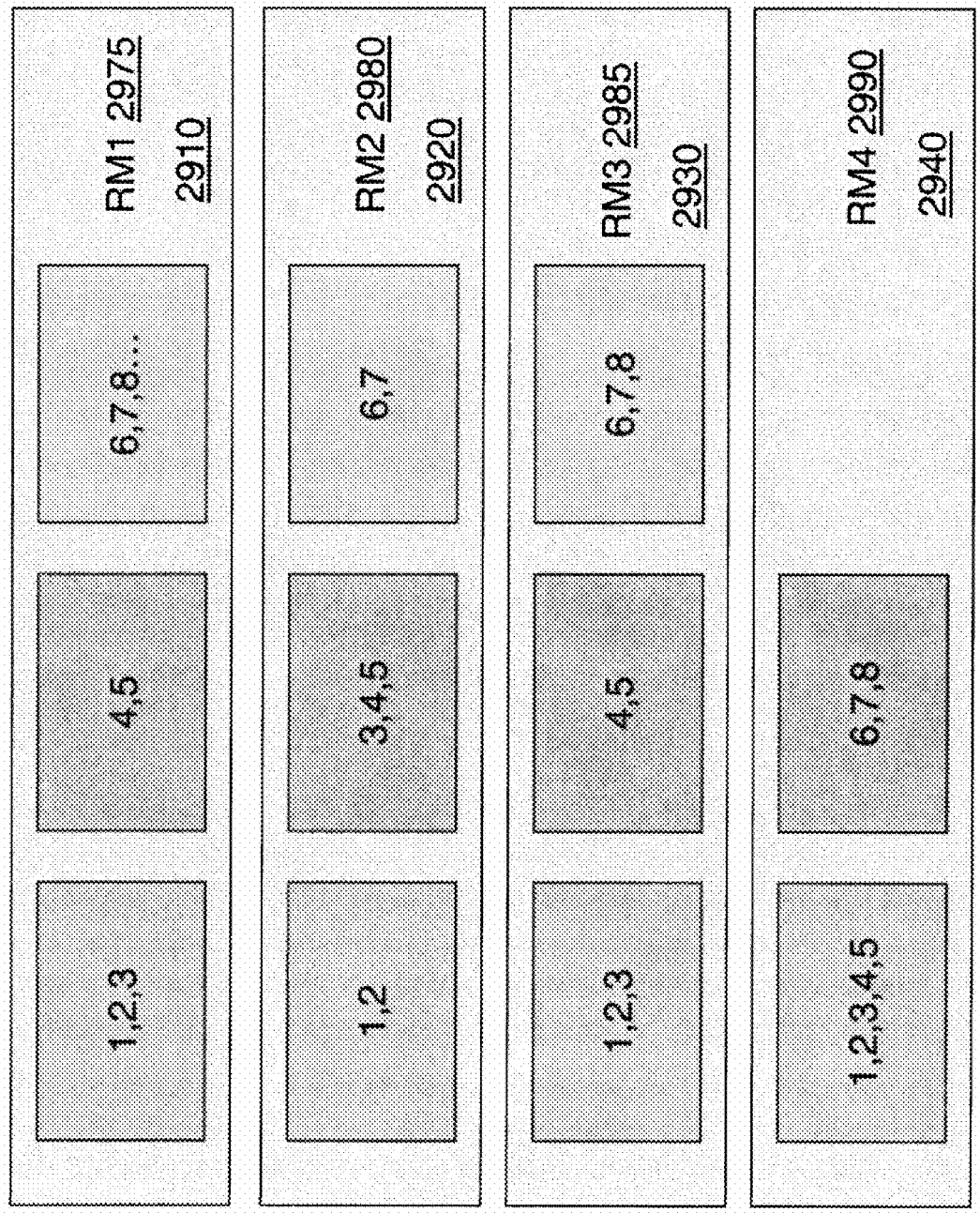
FIG. 29 is an example of a classification problem.

A model such as EMC's SMARTS® would be useful in performing such a root cause analysis. Of course, there are many methods of performing a root cause analysis and SMARTS® is a preferred embodiment of performing such an analysis. FIG. 28 represents a codebook such as can be present in SMARTS®. The first column of FIG. 29 represents the predicate logic expressions representing the particular policies to be implemented. Columns 2, 3, and 4, represent the portions of the re-factored policy that would be violated if the indicated resource manager were responsible for the policy violation. Vector denotes the indications or symptoms that a particular policy has been violated. Through the use of this codebook, the system can perform a root cause analysis to see which resource system is the most likely cause of the failure in compliance. In this particular example, the vector has the strongest correlation with column 2 indicating that settings in resource manager are the most likely cause of the failure to adhere to the SOD policy.

Example Embodiment Classification of Resources

A particular embodiment of the aforementioned technique will now be described with respect to where the resources managed in each of the source systems are files or documents and policies express constraints on how they are classified. The policy assessment chosen, in this embodiment, is whether or not the files are classified correctly. Further, if the files can be classified as unclassified, confidential, secret and top secret, the policy assessment would determine if, across the different sources, each source correctly classified that document. Proper classification often drives downstream processing and as such, assessing proper classification can have the effect of determining whether each document is stored or secured correctly.

As shown in FIG. 7, the steps for an embodiment of this technique include representing an information topology 750, wherein the information topology comprises a plurality of resources and a plurality of states, representing a set of polices 760, wherein each policy expresses one or more requirements applied to the plurality of resources, and assessing compliance of the information topology by determining whether the states meet the requirements expressed in the policies 770.

As well, implementation of an embodiment of this technique requires creating a representation of a common information topology and populating that topology with information from numerous source systems. Policies that can be applied to the common information topology can also be described. Once described against the common information topology, the common information topology can then be tested for compliance with policies.

Referring to FIG. 29, four classifications systems, 2910, 2920, 2930 and 2940 are shown. Each classification system has classified resources managed by a resource manager, RM1 2975, RM2 2980, RM3 2985 and RM4 2990. As well, within each resource managers, there are copies of documents 1, 2, 3, 4, 5, 6, 7, and 8. That is, documents 1 in RM2, RM3 and RM4 are copies of document 1 in RM1. Also, each resource manager can have a distinct description of its grade of classification. This could be levels such as 1, 2, or 3; low, medium, and high; or none (or unclassified), confidential and restricted. However, within the normalized model as represented, the grouping of each document by its resource manager has been normalized to be grouped according to a level, high 2950, medium 2960, or low 2970.

For example, RM1 2975 has documents 1, 2, and 3 classified as high, whereas RM4 2990 has documents 1, 2, 3, 4, 5 classified as high. Further, note that RM4 2990 only has two classification levels, high 2950 and medium 2960. Of particular importance for the documents in these classifications would be to ensure that a document in any resource manager is not classified below a given level. For example, if RM1 described the proper classification of document 3 as high 2950, then a policy would be to ensure that no classification allowed document 3 lower than a high 2950 level of protection. A way of performing this comparison could be to compare the state of the information nodes in the normalized information topology.

Figure 30:
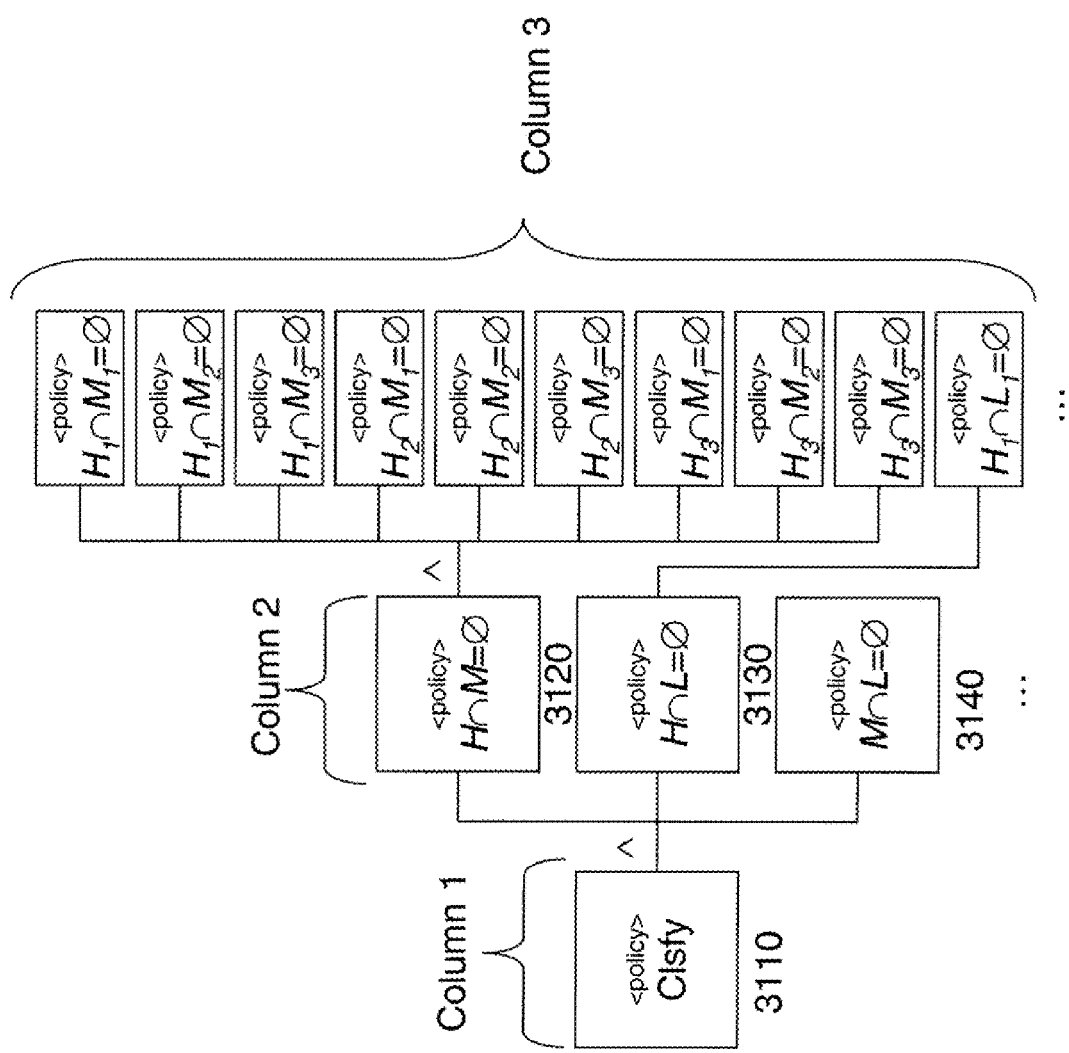
FIG. 30 is an illustration of the classification problem with policies represented as predicate logic and an expansion of the sets of documents.
Figure 31:
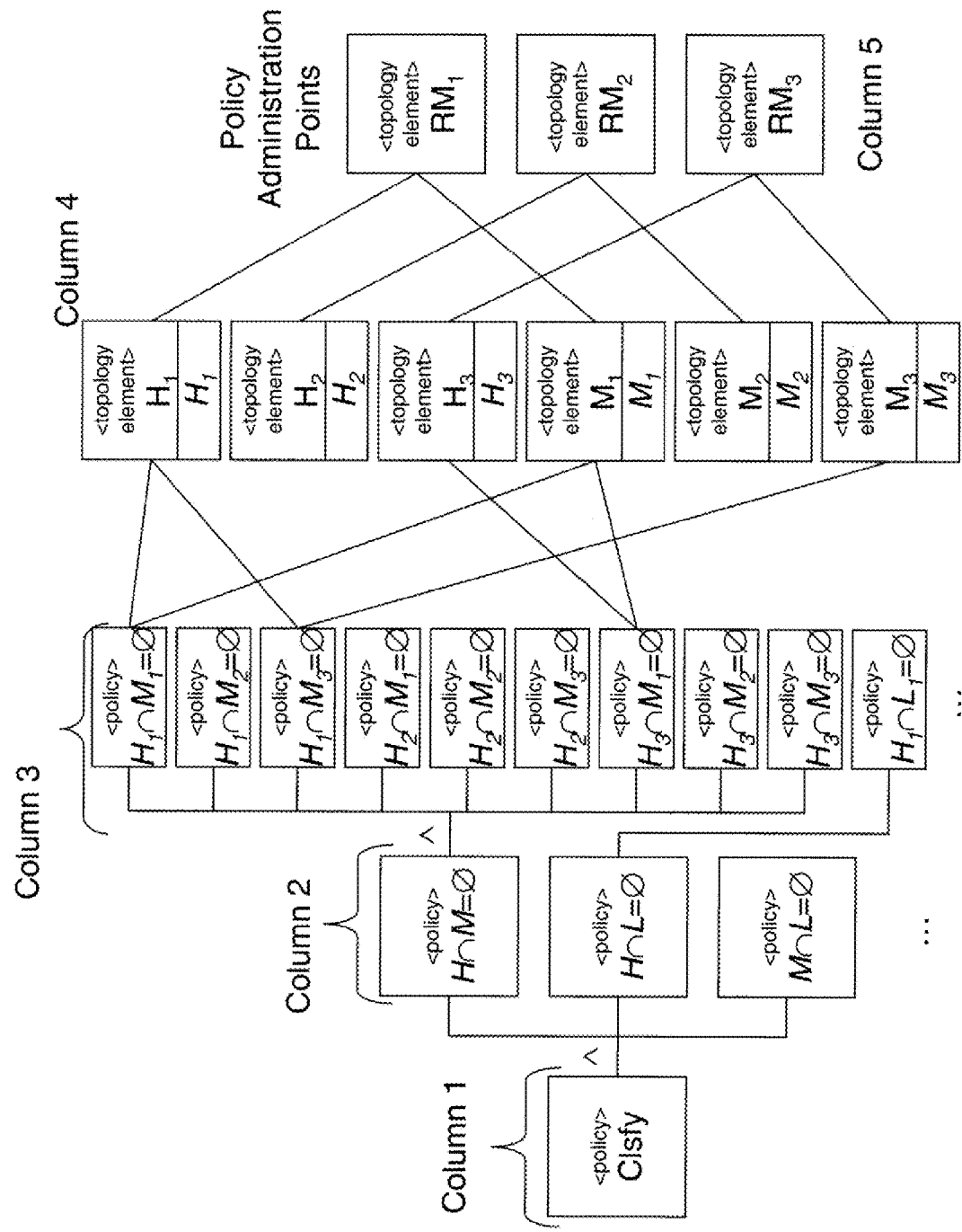
FIG. 31 is an expansion of FIG. 30 mapping each element back to its associated resource manager.

In the aggregate, an example of this type of policy could be that there should be no overlap between the levels of classification between resource managers. This type of policy could be expressed in a predicate logic expression as: $H \cap M = \emptyset$ and $H \cap L = \emptyset$ and $M \cap L = \emptyset$. Referring to FIG. 30, the classification policy is expressed in 3110, the constituent parts of the policy are expressed in 3120, 3130, and 3140, and column 3 represents an expansion of the members of this set into its atomic elements. Further referring to FIG. 31, the classification policy has been attached to the appropriate elements of the information topology.

Figure 32:
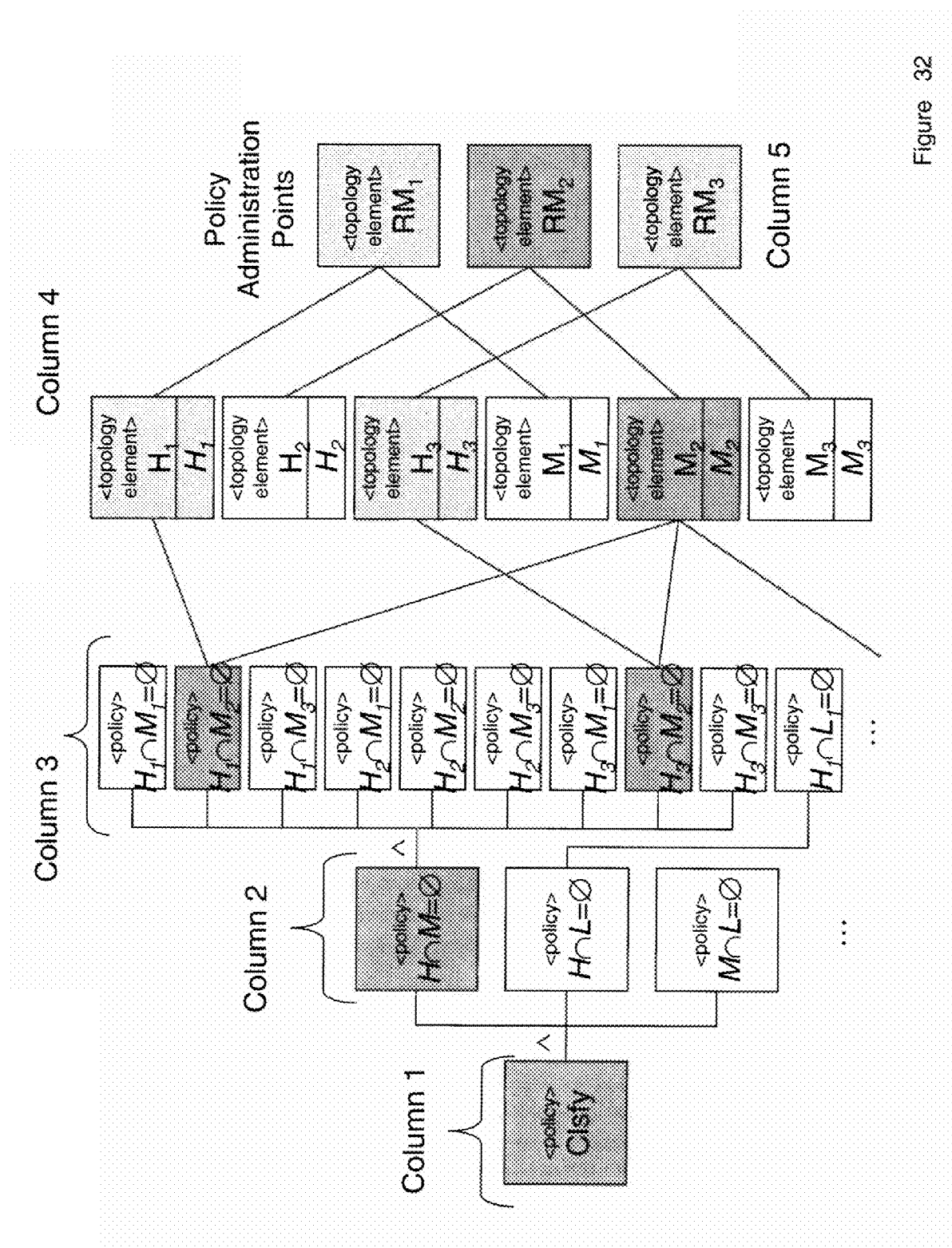
FIG. 32 is an illustration of FIG. 31 wherein the resource manager violating the classification policy has been identified.

Now, referring back to FIG. 29 while referencing FIG. 32, recall that it was stated a policy of this classification system could be that no resource manager had a classification of document 3 less than that of RM1. Note that in FIG. 29, RM2 has document 3 classified at a different level than RM1, that is RM2 has document 3 classified as medium, not high. FIG. 32 shows that $H_1 \cap M_2 \neq \emptyset$ and $H_3 \cap M_2 \neq \emptyset$, as indicated with the red shading of the two boxes in column 3. Those boxes indicate that the $H \cap M \neq \emptyset$ portion of the classification policy, and hence the entire classification policy has been violated. The root cause analysis feature of this invention determines that based on the enunciated policy, RM2 is the most likely root cause of this non-compliance, as indicated by the darkest shading of the box labeled RM$_2$ is column 5.

A model such as EMC's SMARTS® would be useful in performing such a root cause analysis. Of course, there are many methods of performing a root cause analysis and SMARTS® is a preferred embodiment of performing such an analysis. FIG. 33 represents a codebook such as can be present in SMARTS®. The first column of FIG. 33 represents the predicate logic expressions representing the particular policies to be implemented. Here, the policies are that no documents of a particular categorization in a resource manager may overlap with a different categorization in a different resource manager. Columns 2, 3, and 4, represent the portions of the refactored policy that would be violated if the indicated resource manager were responsible for the policy violation. Vector denotes the indications or symptoms that a particular policy has been violated. Through the use of this codebook, the system can perform a root cause analysis to see which resource system is the most likely cause of the failure in compliance.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method executed on a computer comprising:
   representing an information topology on the computer, wherein the represented information topology comprises a plurality of information nodes and a plurality of states;
   representing a set of polices on the computer, wherein each policy of the set of policies expresses one or more requirements applied to the plurality of information nodes; and
   assessing compliance of the represented information topology by determining on the computer whether the plurality of states meet the requirements expressed in the plurality of policies; where the set of policies comprises a Compliance Classification Assessment policy;
   wherein the compliance classification assessment policy defines a requirement of consistent classification of the resources or the aggregation of resources into one of more sets;
   wherein the plurality of states comprises an actual state, capabilities, and a required state; and
   wherein the assessing comprises comparing the actual state, the required state, and the capabilities.

2. The method of claim 1, wherein the plurality of information nodes represents an aggregation of resources managed by a plurality of resource managers; and
   wherein the aggregation of resources results from the application of a transformation mapping of a plurality of the resources managed by each resource manager of the plurality of resource managers to a normalized set of information nodes capable of representation in the information topology.

3. The method of claim 2, wherein changes in the resources managed by each of the resource managers are represented by a change in the information nodes in the information topology.

4. The method of claim 2 further comprising:
   tracing non-compliance of the information topology to the resource manager of the plurality of resource managers which caused the non-compliance.

5. The method of claim 2 further comprising:
Performing impact analysis by tracing the effects of changes made to the information topology, back to the plurality of resource managers.

6. The method of claim 1, wherein the set of policies comprises a comparison between at least one of the members of the group consisting of an actual state of the represented information topology, a required state of the information topology, and capabilities of the represented information topology and at least one state of the information topology.

7. The method of claim 1, wherein the set of policies comprises a separation of duties policy; and
wherein the separation of duties policy defines which users are allowed to access which resources of the aggregation of resources.

8. The method of claim 1, wherein the plurality of information nodes represents one or more sets and the set of policies represent a set of predicate logic expressions that impose constraints on the one or more sets to assess compliance.

9. The method of claim 1, wherein the information topology is derived through a set decomposition process, the set decomposition process comprising:
refactoring governable information objects into state control points, where the state control points are represented as information nodes in the information topology; and
refactoring the set of policies to enable the set of policies to be assessed against the information topology resulting an accurate representation of the same policy assessment if performed on the actual resources.

10. A program product comprising:
a non-transitory computer-readable medium encoded with computer-executable program code enabling:
representing an information topology on the computer system, wherein the represented information topology comprises a plurality of information nodes and a plurality of states;
representing a set of polices on the computer system, wherein each policy of the set of policies expresses one or more requirements applied to the plurality of information nodes and
assessing compliance of the represented information topology by determining on the computer whether the plurality of states meet the requirements expressed in the set of policies;
wherein the set of policies comprises a Compliance Classification Assessment policy;
wherein the compliance classification assessment policy defines a requirement of consistent classification of the resources into one of more sets;
wherein the plurality of states comprises an actual state, capabilities, and a required state; and
wherein the assessing comprises comparing the actual state, the required state, and the capabilities.

11. The program product of claim 10 wherein
wherein the plurality of information nodes represents an aggregation of resources managed by a plurality of resource managers; and
wherein the aggregation of resources results from the application of a transformation mapping of a plurality of the resources managed by each resource manager of the plurality of resource managers to a normalized set of information nodes capable of representation in the information topology.

12. The program product of claim 10, wherein the set of policies comprises a comparison between at least one of the members of the group consisting of an actual state of the represented information topology, a required state of the topology, and capabilities of the represented information topology and at least one state of the information topology.

13. The program product of claim 12, wherein changes in the resources managed by each of the resource managers are represented by a change in the information nodes in the information topology.

14. The program product of claim 10, wherein the set of policies comprises a separation of duties policy,
wherein the separation of duties policy defines which users are allowed to access which resources.

15. The program product of claim 10, wherein the plurality of information nodes represents one or more sets and the set of policies represent a set of predicate logic expressions that impose constraints on the one or more sets to assess compliance.

16. A system comprising:
representing an information topology on a computer, wherein the represented information topology comprises a plurality of information nodes and a plurality of states;
representing a set of policies on the computer, wherein each policy of the set of policies expresses one or more requirements applied to the plurality of information nodes; and
assessing compliance of the represented information topology by determining on the computer whether the plurality of states meet the requirements expressed in the set of policies;
wherein the set of policies comprises a Compliance Classification Assessment policy;
wherein the compliance classification assessment policy defines a requirement of consistent classification of the resources into one of more sets;
wherein the plurality of states comprises an actual state, capabilities, and a required state; and
wherein the assessing step comprises comparing the actual state, the required state, and the capabilities.

17. The system of claim 16, wherein the set of policies comprises a comparison between at least one of the members of the group consisting of an actual state of the represented information topology, a required state of the topology, and capabilities of the represented information topology and at least one state of the information topology.

18. The system of claim 16, wherein the set of policies comprises a separation of duties policy; and
wherein the separation of duties policy defines which users are allowed to access which resources.

19. The system of claim 18 further comprising:
performing impact analysis by tracing the effects of changes made to the information topology, back to the plurality of resource managers.

20. The system of claim 18 wherein changes in the resources managed by each of the resource managers are represented by a change in the information nodes in the information topology.

* * * * *